(12) United States Patent
Chiu et al.

(10) Patent No.: US 10,257,524 B2
(45) Date of Patent: Apr. 9, 2019

(54) RESIDUAL UP-SAMPLING APPARATUS FOR PERFORMING TRANSFORM BLOCK UP-SAMPLING AND RESIDUAL DOWN-SAMPLING APPARATUS FOR PERFORMING TRANSFORM BLOCK DOWN-SAMPLING

(71) Applicant: MEDIATEK INC., Hsin-Chu (TW)

(72) Inventors: Min-Hao Chiu, Hsinchu (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 239 days.

(21) Appl. No.: 15/197,741

(22) Filed: Jun. 29, 2016

(65) Prior Publication Data

US 2017/0006299 A1    Jan. 5, 2017

Related U.S. Application Data

(60) Provisional application No. 62/187,476, filed on Jul. 1, 2015.

(51) Int. Cl.
| | |
|---|---|
| *H04N 19/18* | (2014.01) |
| *H04N 19/50* | (2014.01) |
| *H04N 19/426* | (2014.01) |
| *H04N 19/436* | (2014.01) |

(52) U.S. Cl.
CPC ........... *H04N 19/18* (2014.11); *H04N 19/426* (2014.11); *H04N 19/436* (2014.11); *H04N 19/50* (2014.11)

(58) Field of Classification Search
CPC ...... H04N 19/18; H04N 19/176; H04N 19/30; H04N 19/426; H04N 19/436; H04N 19/50
See application file for complete search history.

(56) References Cited

U.S. PATENT DOCUMENTS

| | | | |
|---|---|---|---|
| 6,611,625 B1 * | 8/2003 | Son | G06T 3/4023 |
| | | | 375/E7.082 |
| 2001/0016010 A1 * | 8/2001 | Kim | H04N 5/4401 |
| | | | 375/240.25 |
| 2005/0013374 A1 * | 1/2005 | Kim | H04N 19/105 |
| | | | 375/240.21 |
| 2006/0268991 A1 * | 11/2006 | Segall | H04B 1/66 |
| | | | 375/240.24 |
| 2007/0286283 A1 * | 12/2007 | Yin | H04N 19/70 |
| | | | 375/240.16 |

(Continued)

*Primary Examiner* — Anner N Holder
(74) *Attorney, Agent, or Firm* — Winston Hsu

(57) ABSTRACT

A residual up-sampling apparatus has a residual up-sampling buffer and a shared residual up-sampling circuit. The residual up-sampling buffer stores an intermediate residual up-sampling result. The shared residual up-sampling circuit employs a same processing kernel to perform a first-direction residual up-sampling operation and a second-direction residual up-sampling operation. The first-direction residual up-sampling operation processes an inverse transform output of an inverse transform circuit to generate the intermediate residual up-sampling result to the residual up-sampling buffer. The second-direction residual up-sampling operation performs transpose access upon the residual up-sampling buffer to retrieve the intermediate residual up-sampling result, and processes the intermediate residual up-sampling result to generate a final residual up-sampling result.

20 Claims, 19 Drawing Sheets

(56) References Cited

U.S. PATENT DOCUMENTS

| | | | |
|---|---|---|---|
| 2009/0095450 A1* | 4/2009 | Asakura | H01L 23/473 165/104.33 |
| 2014/0119442 A1* | 5/2014 | Bossen | H04N 19/184 375/240.12 |
| 2014/0192884 A1* | 7/2014 | Laroche | H04N 19/105 375/240.16 |
| 2015/0139325 A1* | 5/2015 | Chuang | H04N 19/51 375/240.16 |
| 2016/0261877 A1* | 9/2016 | Wang | H04N 19/597 |

* cited by examiner

RESIDUAL UP-SAMPLING APPARATUS FOR PERFORMING TRANSFORM BLOCK UP-SAMPLING AND RESIDUAL DOWN-SAMPLING APPARATUS FOR PERFORMING TRANSFORM BLOCK DOWN-SAMPLING

CROSS REFERENCE TO RELATED APPLICATIONS

This application claims the benefit of U.S. provisional application No. 62/187,476, filed on Jul. 1, 2015 and incorporated herein by reference.

BACKGROUND

The present invention relates to a video decoder design and a video encoder design, and more particularly, to a residual up-sampling apparatus for performing transform block up-sampling in a video encoder/decoder and a residual down-sampling apparatus for performing transform block down-sampling in a video encoder.

The conventional video coding standards generally adopt a block based coding technique to exploit spatial and temporal redundancy. For example, the basic approach is to divide the whole source frame into a plurality of blocks, perform prediction on each block, transform residuals of each block, and perform quantization, scan and entropy encoding. Besides, a reconstructed frame is generated in an internal decoding loop of the video encoder to provide reference pixel data used for coding following blocks. For example, inverse scan, inverse quantization, and inverse transform may be included in the internal decoding loop of the video encoder to recover residuals of each block that will be added to predicted samples of each block for generating a reconstructed frame. The functions of the internal decoding loop of the video encoder are also implemented in a video decoder for recovering residuals of each block and generating a reconstructed frame.

For certain video coding standards, residual down-sampling of transform blocks and residual up-sampling of transform blocks may be implemented in a video encoder, and residual up-sampling of transform blocks may be implemented in a video decoder. There is a need for innovative residual down-sampling design and residual up-sampling design with low cost and/or high performance.

SUMMARY

One of the objectives of the claimed invention is to provide a residual up-sampling apparatus for performing transform block up-sampling in a video encoder/decoder and a residual down-sampling apparatus for performing transform block down-sampling in a video encoder.

According to a first aspect of the present invention, an exemplary residual up-sampling apparatus is disclosed. The exemplary residual up-sampling apparatus includes a residual up-sampling buffer and a shared residual up-sampling circuit. The residual up-sampling buffer is arranged to store an intermediate residual up-sampling result. The shared residual up-sampling circuit is arranged to employ a same processing kernel to perform a first-direction residual up-sampling operation and a second-direction residual up-sampling operation, wherein the first-direction residual up-sampling operation processes an inverse transform output of an inverse transform circuit to generate the intermediate residual up-sampling result to the residual up-sampling buffer, and the second-direction residual up-sampling operation performs transpose access upon the residual up-sampling buffer to retrieve the intermediate residual up-sampling result, and processes the intermediate residual up-sampling result to generate a final residual up-sampling result.

According to a second aspect of the present invention, an exemplary residual down-sampling apparatus is disclosed. The exemplary residual down-sampling apparatus includes a residual down-sampling buffer and a shared residual down-sampling circuit. The residual down-sampling buffer is arranged to store an intermediate residual down-sampling result. The shared residual down-sampling circuit is arranged to employ a same processing kernel to perform a first-direction residual down-sampling operation and a second-direction residual down-sampling operation, wherein the first-direction residual down-sampling operation processes a residual generation output of a residual generation circuit to generate the intermediate residual down-sampling result to the residual down-sampling buffer, and the second-direction residual down-sampling operation performs transpose access upon the residual down-sampling buffer to retrieve the intermediate residual down-sampling result, and processes the intermediate residual down-sampling result to generate a final residual down-sampling result.

According to a third aspect of the present invention, an exemplary residual up-sampling circuit is disclosed. The exemplary residual up-sampling circuit includes a residual up-sampling transpose buffer, a first-direction residual up-sampling circuit, and a second-direction residual up-sampling circuit. The residual up-sampling transpose buffer is arranged to store an intermediate residual up-sampling result. The first-direction residual up-sampling circuit is arranged to process an inverse transform output of an inverse transform circuit to generate the intermediate residual up-sampling result to the residual up-sampling transpose buffer. The second-direction residual up-sampling circuit is arranged to perform transpose access upon the residual up-sampling transpose buffer to retrieve the intermediate residual up-sampling result, and process the intermediate residual up-sampling result to generate a final residual up-sampling result. One of the first-direction residual up-sampling circuit and the second-direction residual up-sampling circuit starts processing residuals of a transform block before another of the first-direction residual up-sampling circuit and the second-direction residual up-sampling circuit finishes processing residuals of the transform block, or one of the first-direction residual up-sampling circuit and the second-direction residual up-sampling circuit starts processing residuals of one transform block before another of the first-direction residual up-sampling circuit and the second-direction residual up-sampling circuit finishes processing residuals of another transform block.

According to a fourth aspect of the present invention, an exemplary residual down-sampling circuit is disclosed. The exemplary residual down-sampling circuit includes a residual down-sampling transpose buffer, a first-direction residual down-sampling circuit, and a second-direction residual down-sampling circuit. The residual down-sampling transpose buffer is arranged to store an intermediate residual down-sampling result. The first-direction residual down-sampling circuit is arranged to process a residual generation output of a residual generation circuit to generate the intermediate residual down-sampling result to the residual down-sampling transpose buffer. The second-direction residual down-sampling circuit is arranged to perform transpose access upon the residual down-sampling transpose buffer to retrieve the intermediate residual down-sampling result, and process the intermediate residual down-sampling result to generate a final residual down-sampling result. One of the first-direction residual down-sampling circuit and the second-direction residual down-sampling circuit starts processing residuals of a transform block before another of the first-direction residual down-sampling circuit and the second-direction residual down-sampling circuit finishes processing residuals of the transform block, or one of the first-direction residual down-sampling circuit and the second-direction residual down-sampling circuit starts processing residuals of one transform block before another of the first-direction residual down-sampling circuit and the second-direction residual down-sampling circuit finishes processing residuals of another transform block.

According to a fifth aspect of the present invention, an exemplary residual up-sampling apparatus is disclosed. The exemplary residual up-sampling apparatus includes a one-pass up-sampling circuit arranged to perform a one-pass two-dimensional (2D) up-sampling operation upon an inverse transform output of an inverse transform circuit to output a plurality of up-sampled residuals one by one, wherein the one-pass 2D up-sampling operation has a first-direction residual up-sampling operation and a second-direction residual up-sampling operation merged without transpose access.

According to a sixth aspect of the present invention, an exemplary residual down-sampling apparatus is disclosed. The exemplary residual down-sampling apparatus includes a one-pass down-sampling circuit arranged to perform a one-pass two-dimensional (2D) down-sampling operation upon a residual generation output of a residual generation circuit to output a plurality of down-sampled residuals one by one, wherein the one-pass 2D down-sampling operation has a first-direction residual down-sampling operation and a second-direction residual down-sampling operation merged without transpose access.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

For certain video coding standards, residual down-sampling of transform blocks and residual up-sampling of transform blocks may be implemented in a video encoder, and residual up-sampling of transform blocks may be implemented in a video decoder. For example, the second generation of Audio-video coding standard (AVS2) is an application-oriented video coding standard aiming at higher video coding efficiency. In accordance with the AVS2 coding standard, residual down-sampling of transform blocks and residual up-sampling of transform blocks are enabled under some scenarios. For example, when the coding unit (CU) size is 64×64, there are four scenarios for luminance (luma) Y transform blocks (TBs), as listed in the following table. It should be noted that, when CU size=64×64, the chroma TBs are always a 32×32 Cb TB and a 32×32 Cr TB.

| Scenario | Transform_split_flag | TransformSplitDirection | Direction | Number of TBs in CU and TB size before residual up-sampling (or Number of TBs in CU and TB size after residual down-sampling) | Number of TBs in CU and TB size after residual up-sampling (or Number of TBs in CU and TB size before residual down-sampling) |
|---|---|---|---|---|---|
| 1 | 0 | N.A. | N.A. | 1 x (32 x 32 Y TB) | 1 x (64 x 64 Y TB) |
| 2 | 1 | 1 | horizontal | 4 x (32 x 8 Y TB) | 4 x (64 x 16 Y TB) |
| 3 | 1 | 2 | vertical | 4 x (8x32 Y TB) | 4 x (16 x 64 Y TB) |
| 4 | 1 | 0 | No direction | 4 x (32 x 32 Y TB) | |

The syntax transform_split_flag is recorded in a header of a CU, and defines whether to split the TB or not. The syntax TransformSplitDirection defines the split TB direction. The residual up-sampling/down-sampling is performed in scenario 1/2/3.

Figure 1:
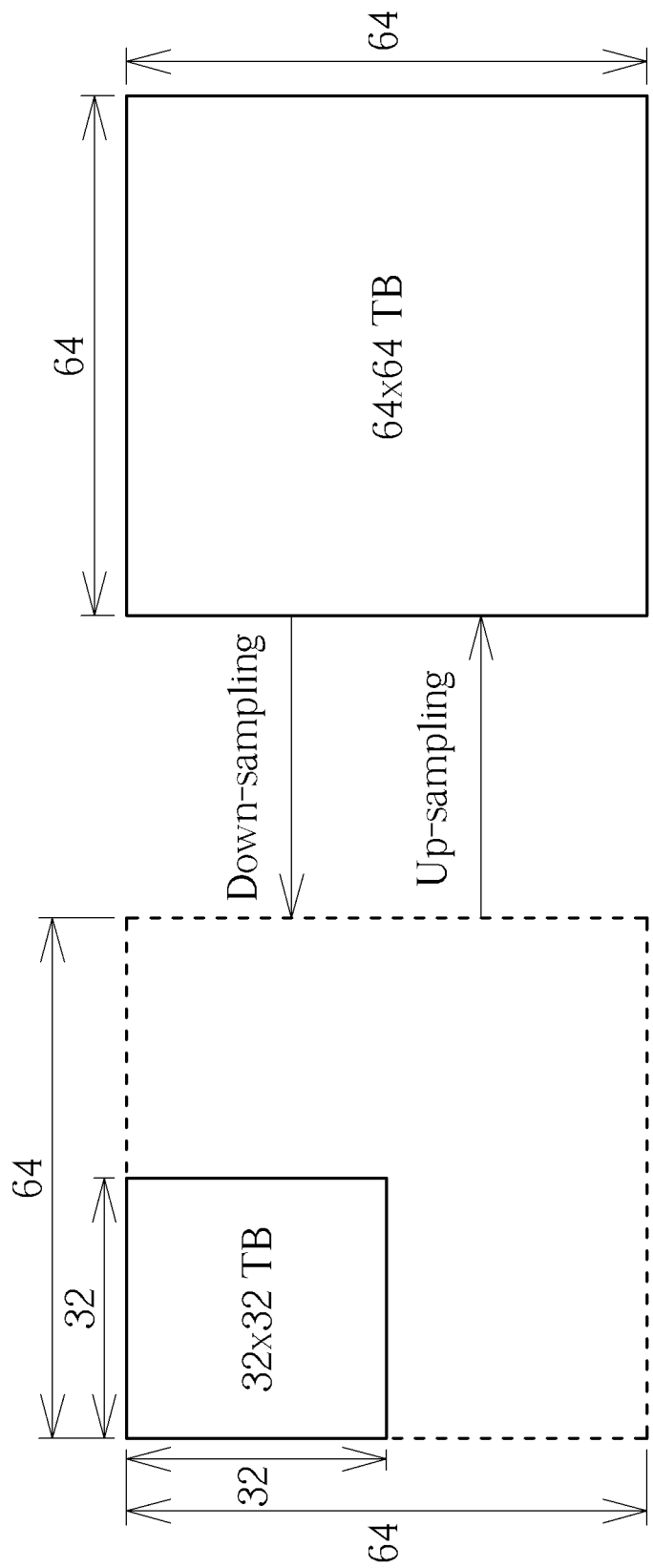
FIG. 1 is a diagram illustrating the residual up-sampling and down-sampling in scenario 1.

FIG. 1 is a diagram illustrating the residual up-sampling and down-sampling in scenario 1. With regard to the residual up-sampling, one 32×32 TB may sequentially undergo vertical up-sampling and horizontal up-sampling to generate one 64×64 TB. The output order of residuals after up-sampling is from the top-most 64×1 row to the bottom-most 64×1 row of the 64×64 TB. With regard to the residual down-sampling, one 64×64 TB may sequentially undergo horizontal up-sampling and vertical down-sampling to generate one 32×32 TB. The output order of residuals after down-sampling is from the top-most 32×1 row to the bottom-most 32×1 row of the 32×32 TB.

Figure 2:
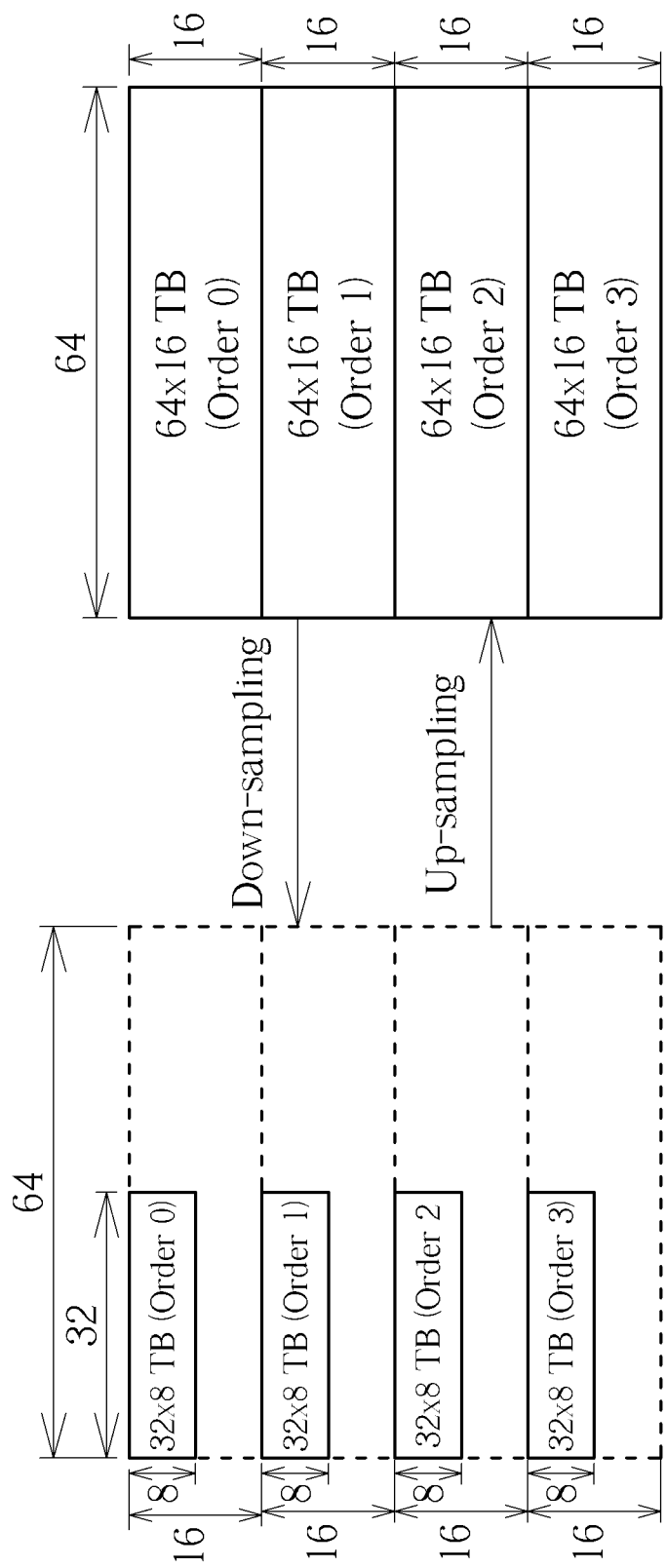
FIG. 2 is a diagram illustrating the residual up-sampling and down-sampling at scenario 2.

FIG. 2 is a diagram illustrating the residual up-sampling and down-sampling at scenario 2. With regard to the residual up-sampling, each of four 32×8 TBs may sequentially undergo vertical up-sampling and horizontal up-sampling to generate one 64×16 TB. For example, vertical up-sampling may be applied to the four 32×8 TBs in an order of 0→1→2→3, and horizontal up-sampling may be applied to the four 32×8 TBs in an order of 0→1→2→3. Hence, one 64×64 TB can be obtained after four 64×16 TBs are generated by up-sampling. With regard to the residual down-sampling, one 64×64 TB is divided into four 64×16 TBs, and each of the 64×16 TBs may sequentially undergo horizontal down-sampling and vertical down-sampling to generate one 32×8 TB. For example, horizontal down-sampling may be applied to the four 64×16 TBs in an of order 0→1→2→3, and vertical down-sampling may be applied to the four 64×16 TBs in an order of 0→1→2→3.

Figure 3:
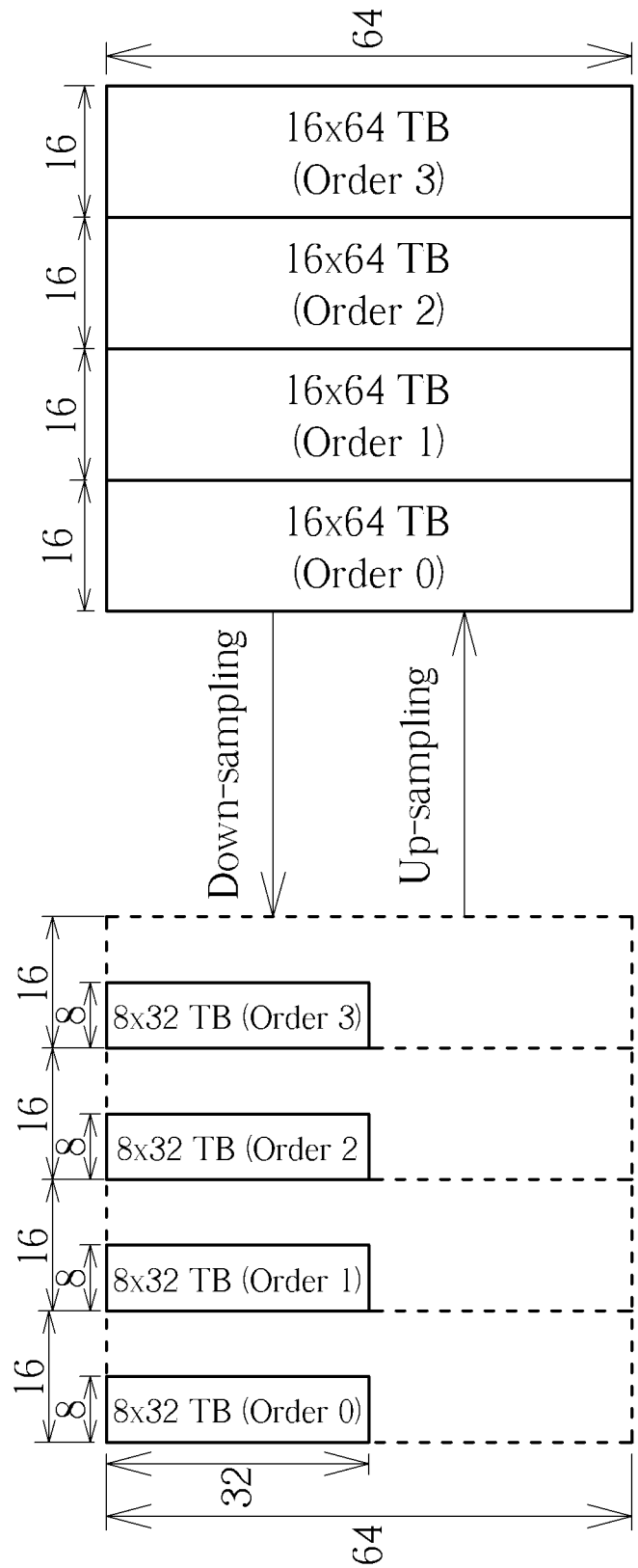
FIG. 3 is a diagram illustrating the residual up-sampling and down-sampling in scenario 3.

FIG. 3 is a diagram illustrating the residual up-sampling and down-sampling in scenario 3. With regard to the residual up-sampling, each of four 8×32 TBs may sequentially undergo vertical up-sampling and horizontal up-sampling to generate one 16×64 TB. For example, vertical up-sampling may be applied to the four 8×32 TBs in an order of 0→1→2→3, and horizontal up-sampling may be applied to the four 8×32 TBs in an order of 0→1→2→3. One 64×64 TB can be obtained after four 16×64 TBs are generated by up-sampling. With regard to the residual down-sampling, one 64×64 TB is divided into four 16×64 TBs, and each of the 16×64 TBs may sequentially undergo horizontal down-sampling and vertical down-sampling to generate one 8×32 TB. For example, horizontal down-sampling may be applied to the four 16×64 TBs in an order of 0→1→2-3, and vertical down-sampling may be applied to the four 16×64 TBs in an order of 0→1→2→3.

A residual down-sampling stage may be located between a preceding residual generation stage and a following transform stage, and a residual up-sampling may be located between a preceding inverse transform and a following residual generation stage. The residual down-sampling function is implemented in a video encoder. Since a video encoder has a decoding loop embedded therein, the residual up-sampling is implemented in both of a video encoder and a video encoder. The present invention proposes innovative residual down-sampling design and residual up-sampling design with low cost and/or high performance. Further details are described as below.

It should be noted that the term "circuit" mentioned hereinafter may be dedicated pure hardware for achieving the designated functionality or may be a processor running a software module for achieving the designated functionality. That is, an encoding/decoding function (e.g., a residual up-sampling/down-sampling function) may have a hardware-based implementation or a software-based implementation, depending upon the actual design considerations.

Figure 4:
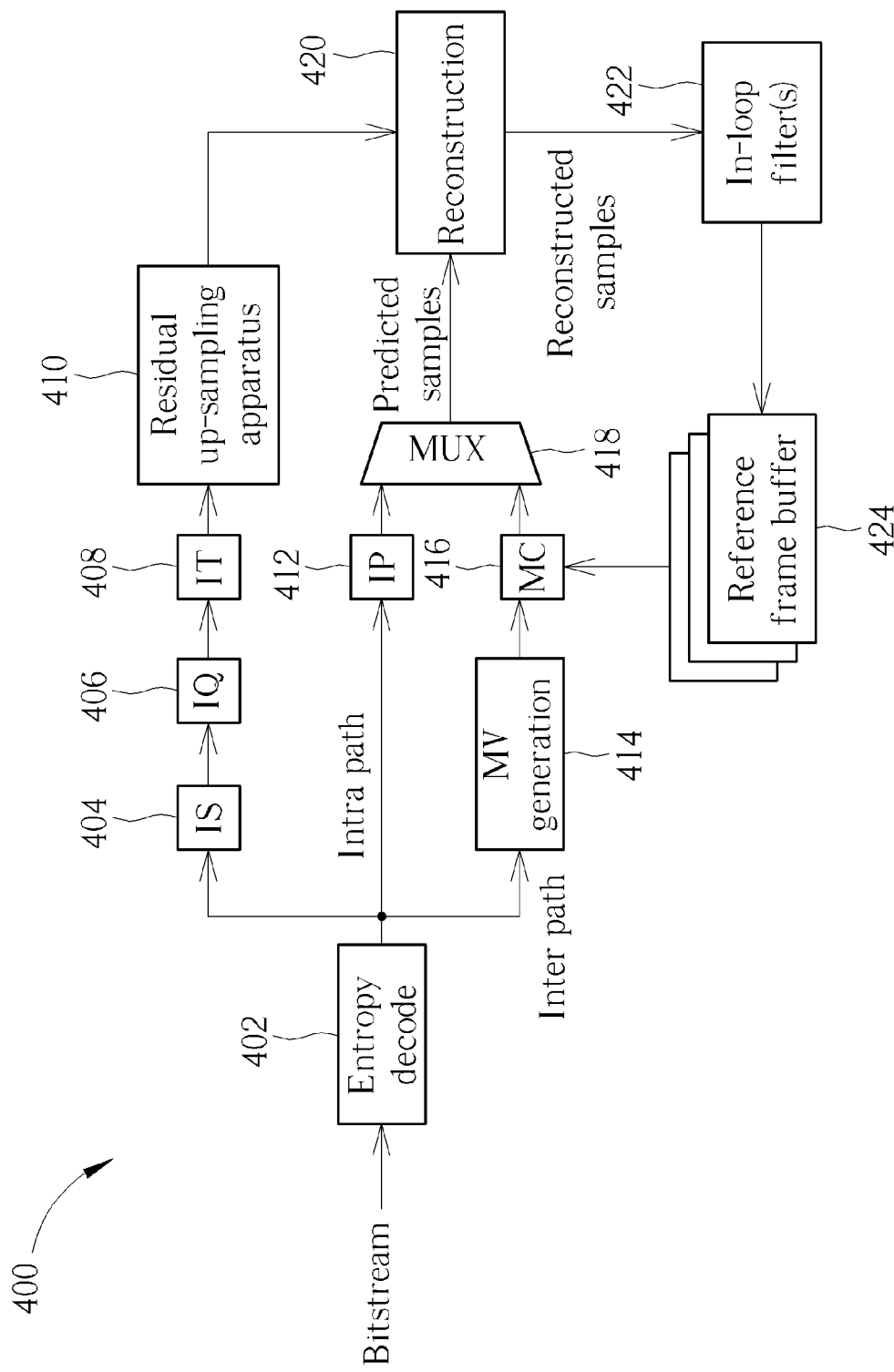
FIG. 4 is a diagram illustrating a video decoder for decoding a bitstream according to an embodiment of the present invention.

FIG. 4 is a diagram illustrating a video decoder for decoding a bitstream according to an embodiment of the present invention. The video decoder 400 has fundamental decoding components, such as an entropy decoder (denoted by "Entropy decode") 402, an inverse scan circuit (denoted by "IS") 404, an inverse quantization circuit (denoted by "IQ") 406, an inverse transform circuit (denoted by "IT") 408, an intra prediction circuit (denoted by "IP" located in an intra path) 412, a motion vector generation circuit (denoted by "MV generation" located in an inter path) 414, a motion compensation circuit (denoted by "MC" located in the inter path) 416, a multiplexer (denoted by "MUX" which outputs predicted samples) 418, a reconstruction circuit (denoted by "Reconstruction" which output reconstructed samples) 420, one or more in-loop filters (e.g., deblocking filter, Sample adaptive offset (SAO) filter, etc.) 422, and one or more reference frame buffers 424. As shown in FIG. 4, the proposed residual up-sampling apparatus 410 is coupled between the inverse transform circuit 408 and the reconstruction circuit 420. In other words, the residual up-sampling apparatus 410 performs up-sampling upon residuals included in an inverse transform output of the inverse transform circuit 408, and outputs up-sampled residuals to the reconstruction circuit 420. In a case where the video decoder 400 complies with AVS2 coding standard, the inverse transform circuit 408 may be configured to perform a two-stage inverse transform that sequentially performs a second inverse transform (e.g., inverse wavelet transform) and a first inverse transform (e.g., inverse discrete cosine transform (IDCT)). However, this is not meant to be a limitation of the present invention. Any video decoder using the proposed residual up-sampling apparatus 410 with low cost and/or high performance falls within the scope of the present invention.

Figure 5:
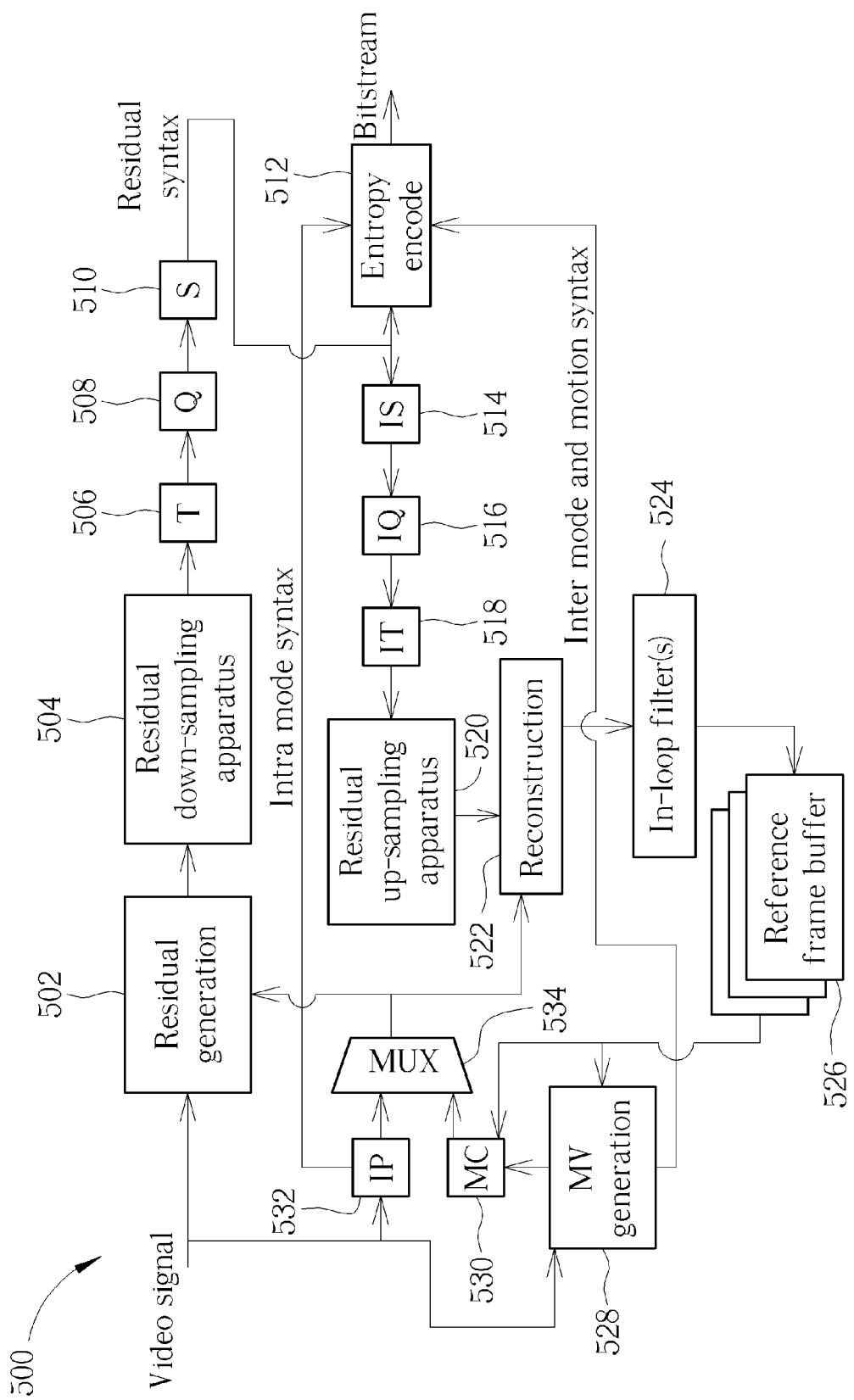
FIG. 5 is a diagram illustrating a video encoder for encoding a video signal according to an embodiment of the present invention.

FIG. 5 is a diagram illustrating a video encoder for encoding a video signal according to an embodiment of the present invention. The video encoder 500 has fundamental encoding components, such as a residual generation circuit (denoted by "Residual generation") 502, a transform circuit (denoted by "T") 506, a quantization circuit (denoted by "Q") 508, a scan circuit (denoted by "S" which outputs residual syntax) 510, an entropy encoder (denoted by "Entropy encode" which outputs a bitstream) 512, an inverse scan circuit (denoted by "IS") 514, an inverse quantization circuit (denoted by "IQ") 516, an inverse transform circuit (denoted by "IT") 518, a reconstruction circuit (denoted by "Reconstruction") 522, one or more in-loop filters (e.g., deblocking filter, SAO filter, etc.) 524, one or more reference frame buffers 526, a motion vector generation circuit (denoted by "MV generation" which outputs inter mode and motion syntax) 528, a motion compensation circuit (denoted by "MC") 530, an intra prediction circuit (denoted by "IP" which outputs intra mode syntax) 532, and a multiplexer (denoted by "MUX") 534. As shown in FIG. 5, one proposed residual down-sampling apparatus 504 is coupled between the residual generation circuit 502 and the transform circuit 506, and one proposed residual up-sampling apparatus 520 is coupled between the inverse transform circuit 518 and the reconstruction circuit 522. In other words, the residual down-sampling apparatus 504 performs down-sampling upon residuals included in a residual generation output of the residual generation circuit 502, and outputs down-sampled residuals to the transform circuit 506; and the residual up-sampling apparatus 520 performs up-sampling upon residuals included in an inverse transform output of the inverse transform circuit 518, and outputs up-sampled residuals to the reconstruction circuit 522. In a case where the video encoder 500 complies with AVS2 coding standard, the transform circuit 506 may be configured to perform a two-stage transform which sequentially performs a first transform (e.g., discrete cosine transform (DCT)) and a second transform (e.g., wavelet transform), and the inverse transform circuit 518 may be configured to perform a two-stage inverse transform which sequentially performs a second inverse transform (e.g., inverse wavelet transform) and a first inverse transform (e.g., inverse discrete cosine transform (IDCT)). However, this is not meant to be a limitation of the present invention. Any video encoder using the proposed residual down-sampling apparatus 504 with low cost and/or high performance falls within the scope of the present invention, and any video encoder using the proposed residual up-sampling apparatus 520 with low cost and/or high performance falls within the scope of the present invention.

In some embodiments of the present invention, the residual up-sampling apparatus 410/520 may be implemented using one of a plurality of proposed residual up-sampling designs to achieve low cost and/or high performance. Similarly, in some embodiments of the present invention, the residual down-sampling apparatus 504 may be implemented using one of a plurality of proposed residual down-sampling designs to achieve low cost and/or high performance. The proposed residual up-sampling designs and residual up-sampling designs are detailed as below.

Figure 6:
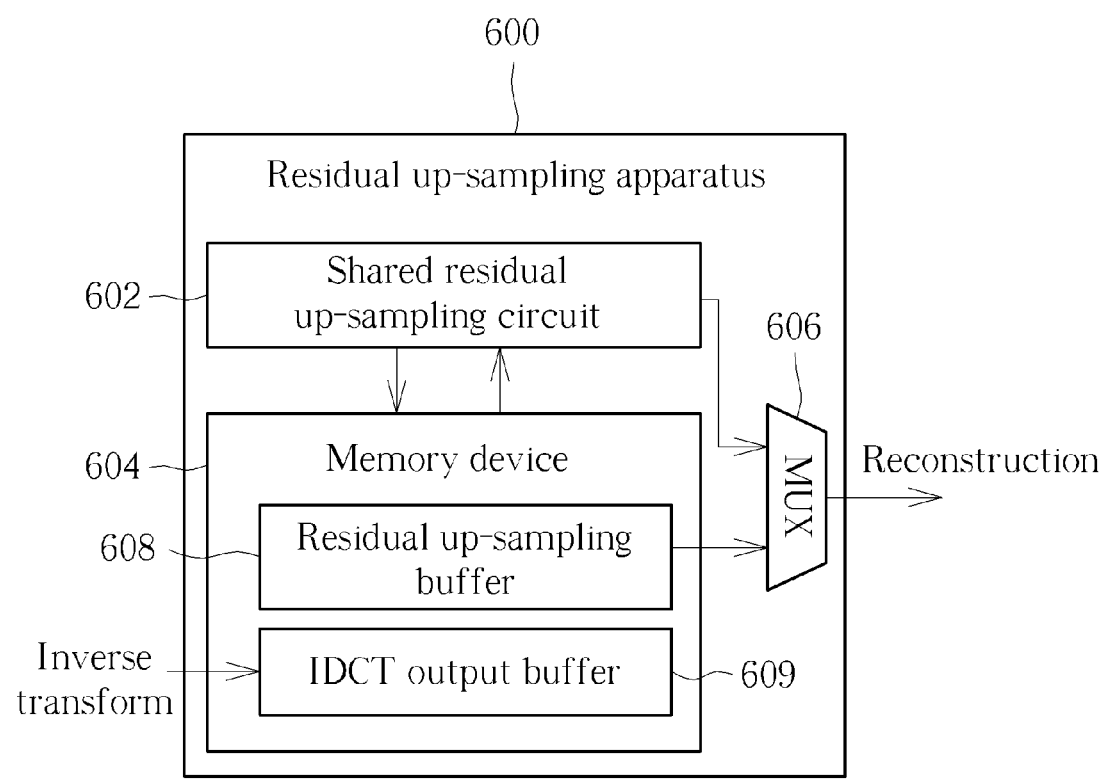
FIG. 6 is a diagram illustrating a low-cost residual up-sampling apparatus according to an embodiment of the present invention.

FIG. 6 is a diagram illustrating a low-cost residual up-sampling apparatus according to an embodiment of the present invention. The residual up-sampling apparatus 410 in the video decoder 400 and/or the residual up-sampling apparatus 520 in the video encoder 500 may be implemented using the residual up-sampling apparatus 600. The residual up-sampling apparatus 600 includes a shared residual up-sampling circuit 602, a memory device 604, and a multiplexer (MUX) 606. In this embodiment, a residual up-sampling buffer 608 and an IDCT output buffer 609 may be both allocated in the same memory device 604. The residual up-sampling buffer 608 is arranged to store an intermediate residual up-sampling result generated by the shared residual up-sampling circuit 602. The IDCT output buffer 609 is arranged to store an IDCT output generated from an IDCT circuit (e.g., inverse transform circuit 408 shown in FIG. 4 or inverse transform circuit 518 shown in FIG. 5). That is, a storage space of the memory device 604 is shared by the residual up-sampling buffer 608 and the IDCT output buffer 609. However, this is for illustrative purposes only, and is not meant to be a limitation of the present invention. Alternatively, the residual up-sampling buffer 608 and the IDCT output buffer 609 may be allocated in separate memory devices, respectively.

The shared residual up-sampling circuit 602 is arranged to employ a same processing kernel to perform a first-direction residual up-sampling operation and a second-direction residual up-sampling operation, wherein the first-direction residual up-sampling operation processes the IDCT output of the IDCT circuit (e.g., inverse transform circuit 408 shown in FIG. 4 or inverse transform circuit 518 shown in FIG. 5) to generate the intermediate residual up-sampling result to the residual up-sampling buffer 608, and the second-direction residual up-sampling operation performs transpose access upon the residual up-sampling buffer 608 to retrieve the intermediate residual up-sampling result, and processes the intermediate residual up-sampling result to generate a final residual up-sampling result. In one exemplary design, the first-direction residual up-sampling operation may be vertical up-sampling, and the second-direction residual up-sampling operation may be horizontal up-sampling. In another exemplary design, the first-direction residual up-sampling operation may be horizontal up-sampling, and the second-direction residual up-sampling operation may be vertical up-sampling.

The residual up-sampling apparatus 600 employs a low-cost residual up-sampling design that uses a single processing kernel to support residual up-sampling in two directions. Specifically, the low-cost residual up-sampling design uses a processing kernel to deal with the first-direction residual up-sampling operation and then re-uses the same processing kernel to deal with the second-direction residual up-sampling operation.

Figure 7:
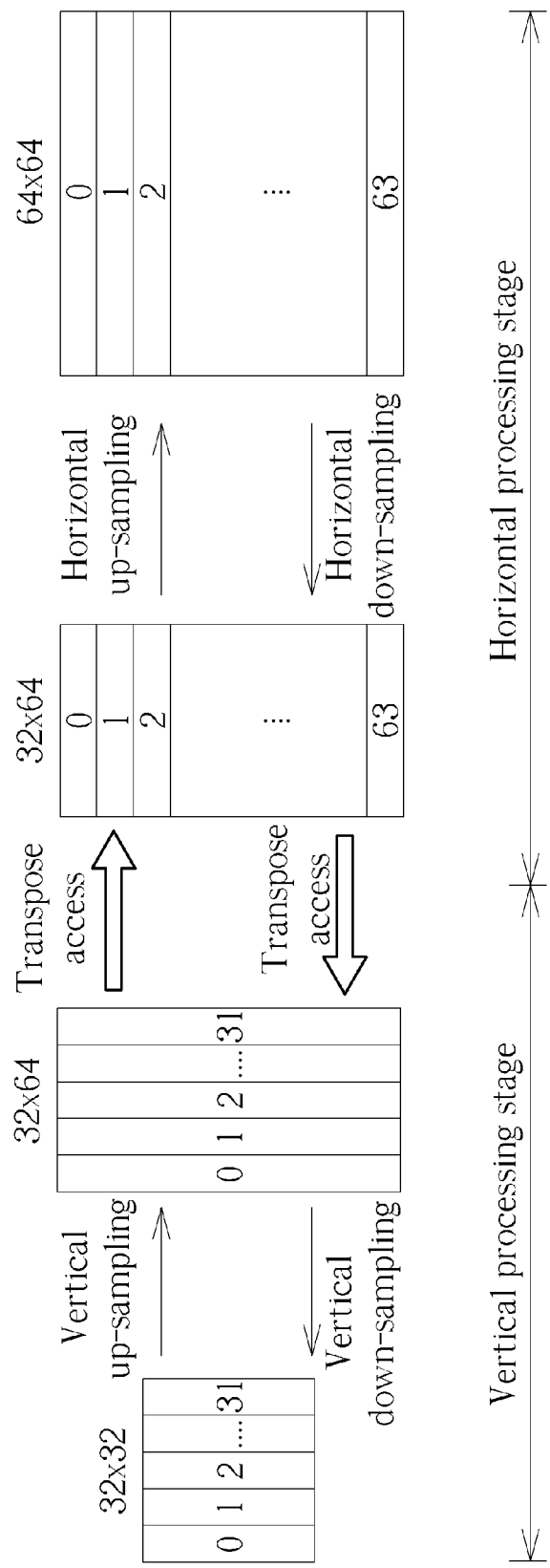
FIG. 7 is a diagram illustrating a residual up-sampling/down-sampling flow according to an embodiment of the present invention.

FIG. 7 is a diagram illustrating a residual up-sampling/down-sampling flow according to an embodiment of the present invention. Suppose that there is a 32×32 TB needed to be up-sampled to a 64×64 TB, and the horizontal up-sampling is performed after the vertical up-sampling is done. The vertical up-sampling and the horizontal up-sampling may have the same up-sampling algorithm but different residual input data sequences. Hence, the processing kernel of the shared residual up-sampling circuit 602 may be used to perform the vertical up-sampling upon residual columns and then may be re-used to perform the horizontal up-sampling upon residual rows. As shown in FIG. 7, the 32×32 TB is up-sampled in the vertical direction at the vertical processing stage. The shared residual up-sampling circuit 602 uses a processing kernel to perform one up-sampling calculation upon each of 32 residual columns. That is, the left-most 1×32 column 0 to the right-most 1×32 column 31 of the 32×32 TB are up-sampled in the vertical direction one by one, such that the left-most 1×64 column 0 to the right-most 1×64 column 31 of the 32×64 TB are generated one by one. After the up-sampling calculation is repeated 32 times, an intermediate up-sampling result (i.e., 32×64 TB generated at the vertical processing stage) is stored in the residual up-sampling buffer 608.

Next, the shared residual up-sampling circuit 602 uses the same processing kernel to perform one up-sampling calculation upon each of 64 residual rows. As mentioned above, the vertical up-sampling stores up-sampled residual columns in the residual up-sampling buffer 608. However, the horizontal up-sampling is performed on the basis of residual rows. Hence, the shared residual up-sampling circuit 602 performs transpose access upon the residual up-sampling buffer 608 to retrieve the residual rows for horizontal up-sampling. As shown in FIG. 7, the top-most 32×1 row 0 to the bottom-most 32×1 row 63 of the 32×64 TB are up-sampled in the horizontal direction one by one, such that the top-most 64×1 row 0 to the bottom-most 64×1 row 63 of the 64×64 TB are generated one by one. After the up-sampling calculation is repeated 64 times, a final up-sampling result (i.e., 64×64 TB generated at the horizontal processing stage) can be obtained for further processing (e.g., reconstruction).

The multiplexer 606 in FIG. 6 is arranged to control the output data path of the final up-sampling result. In one exemplary design, the shared residual up-sampling circuit 602 is arranged to store the final residual up-sampling result in the residual up-sampling buffer 608, and the multiplexer 606 is controlled to allow the residual up-sampling buffer 608 to output the final residual up-sampling result to a reconstruction circuit (e.g., reconstruction circuit 420 shown in FIG. 4 or reconstruction circuit 522 shown in FIG. 5). For example, each up-sampled residual in each 64×1 row of the 64×64 TB is generated from the horizontal up-sampling and then stored into the residual up-sampling buffer 608. As a result, the final residual up-sampling result has to be retrieved by the reconstruction circuit from the residual up-sampling buffer 608.

In another exemplary design, the shared residual up-sampling circuit 602 is arranged to output the final residual up-sampling result to a reconstruction circuit (e.g., reconstruction circuit 420 shown in FIG. 4 or reconstruction circuit 522 shown in FIG. 5) without storing the final residual up-sampling result into the residual up-sampling buffer 608. The multiplexer 606 is therefore controlled to allow the shared residual up-sampling circuit 602 to output the final residual up-sampling result to the reconstruction circuit. For example, each up-sampled residual in each 64×1 row of the 64×64 TB is generated from the horizontal up-sampling and then supplied to the reconstruction circuit at once.

Figure 8:
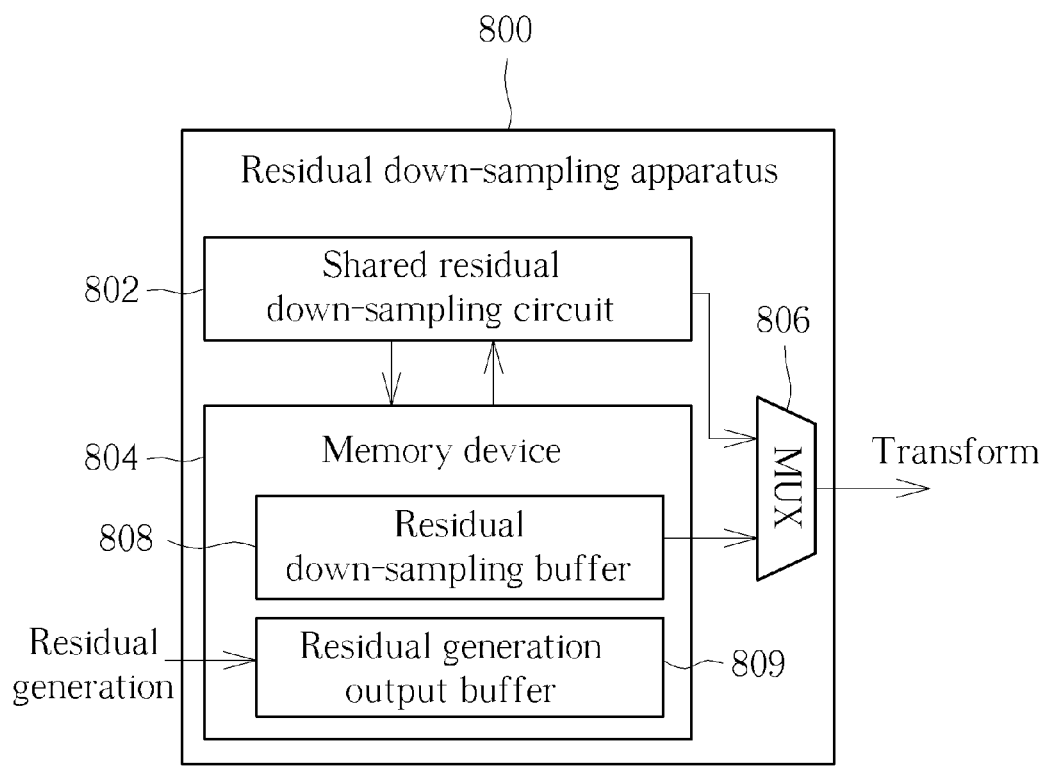
FIG. 8 is a diagram illustrating a low-cost residual down-sampling apparatus according to an embodiment of the present invention.

FIG. 8 is a diagram illustrating a low-cost residual down-sampling apparatus according to an embodiment of the present invention. The residual down-sampling apparatus 504 in the video encoder 500 may be implemented using the residual down-sampling apparatus 800. The residual down-sampling apparatus 800 includes a shared residual down-sampling circuit 802, a memory device 804, and a multiplexer (MUX) 806. In this embodiment, a residual down-sampling buffer 808 and a residual generation output buffer 809 may be both allocated in the same memory device 804. The residual down-sampling buffer 808 is arranged to store an intermediate residual down-sampling result generated by the shared residual down-sampling circuit 802. The residual generation output buffer 809 is arranged to store a residual generation output generated from a residual generation circuit (e.g., residual generation circuit 502 shown in FIG. 5). That is, a storage space of the memory device 804 is shared by the residual down-sampling buffer 808 and the residual generation output buffer 809. However, this is for illustrative purposes only, and is not meant to be a limitation of the present invention. Alternatively, the residual down-sampling buffer 608 and the residual generation output buffer 809 may be allocated in separate memory devices, respectively.

The shared residual down-sampling circuit 802 is arranged to employ a same processing kernel to perform a first-direction residual down-sampling operation and a second-direction residual down-sampling operation, wherein the first-direction residual down-sampling operation processes a residual generation output of a residual generation circuit (e.g., residual generation circuit 502 shown in FIG. 5) to generate the intermediate residual down-sampling result to the residual down-sampling buffer 808, and the second-direction residual down-sampling operation performs transpose access upon the residual down-sampling buffer 808 to retrieve the intermediate residual down-sampling result, and processes the intermediate residual down-sampling result to generate a final residual down-sampling result. In one exemplary design, the first-direction residual down-sampling operation may be horizontal down-sampling, and the second-direction residual down-sampling operation may be vertical up-sampling. In another exemplary design, the first-direction residual down-sampling operation may be vertical down-sampling, and the second-direction residual down-sampling operation may be horizontal down-sampling.

The residual down-sampling apparatus 800 employs a low-cost residual down-sampling design that uses a single processing kernel to support residual down-sampling in two directions. Specifically, the low-cost residual down-sampling design uses a processing kernel to deal with the first-direction residual down-sampling operation and then re-uses the same processing kernel to deal with the second-direction residual down-sampling operation.

Please refer to FIG. 7 again. A residual down-sampling flow is also illustrated in FIG. 7. Suppose that there is a 64×64 TB needed to be down-sampled to a 32×32 TB, and the vertical down-sampling is performed after the horizontal down-sampling is done. The horizontal down-sampling and the vertical down-sampling may have the same down-sampling algorithm but different residual input data sequences. Hence, the processing kernel of the shared residual down-sampling circuit 802 may be used to perform the horizontal down-sampling upon residual rows and then may be re-used to perform the vertical down-sampling upon residual columns. As shown in FIG. 7, the 64×64 TB is down-sampled in the horizontal direction at the horizontal processing stage. The shared residual down-sampling circuit 802 uses a processing kernel to perform one down-sampling calculation upon each of 64 residual rows. That is, the top-most 64×1 row 0 to the bottom-most 64×1 row 63 of the 64×64 TB are down-sampled in the horizontal direction one by one, such that the top-most 32×1 row 0 to the bottom-most 32×1 row 63 of the 32×64 TB are generated one by one. After the down-sampling calculation is repeated 64 times, an intermediate up-sampling result (i.e., 32×64 TB generated at the horizontal processing stage) is stored in the residual down-sampling buffer 808.

Next, the shared residual down-sampling circuit 802 uses the same processing kernel to perform one down-sampling calculation upon each of 32 residual columns. As mentioned above, the horizontal down-sampling stores down-sampled residual rows in the residual up-sampling buffer 808. However, the vertical down-sampling is performed on the basis of residual columns. Hence, the shared residual down-sampling circuit 802 performs transpose access upon the residual down-sampling buffer 808 to retrieve the residual columns for vertical down-sampling. As shown in FIG. 7, the left-most 1×64 column 0 to the right-most 1×64 column 31 of the 32×64 TB are down-sampled in the vertical direction one by one, such that the left-most 1×32 column 0 to the right-most 1×32 column 31 of the 32×32 TB are generated one by one. After the down-sampling calculation is repeated 32 times, a final up-sampling result (i.e., 32×32 TB generated at the vertical processing stage) can be obtained for further processing (e.g., transform).

The multiplexer 806 in FIG. 8 is arranged to control the output data path of the final down-sampling result. In one exemplary design, the shared residual down-sampling circuit 802 is arranged to store the final residual down-sampling result in the residual down-sampling buffer 808, and the multiplexer 806 is controlled to allow the residual down-sampling buffer 808 to output the final residual down-sampling result to a transform circuit (e.g., transform circuit 506 shown in FIG. 5). For example, each down-sampled residual in each 1×32 column of the 32×32 TB is generated from the vertical down-sampling and then stored into the residual down-sampling buffer 808. As a result, the final residual down-sampling result has to be retrieved by the transform circuit from the residual down-sampling buffer 808.

In another exemplary design, the shared residual down-sampling circuit 802 is arranged to output the final residual down-sampling result to a transform circuit (e.g., transform circuit 506 shown in FIG. 5) without storing the final residual down-sampling result into the residual down-sampling buffer 808. The multiplexer 806 is therefore controlled to allow the shared residual down-sampling circuit 802 to output the final residual down-sampling result to the transform circuit. For example, each down-sampled residual in each 1×32 column of the 32×32 TB is generated from the vertical down-sampling and then supplied to the transform circuit at once.

Figure 9:
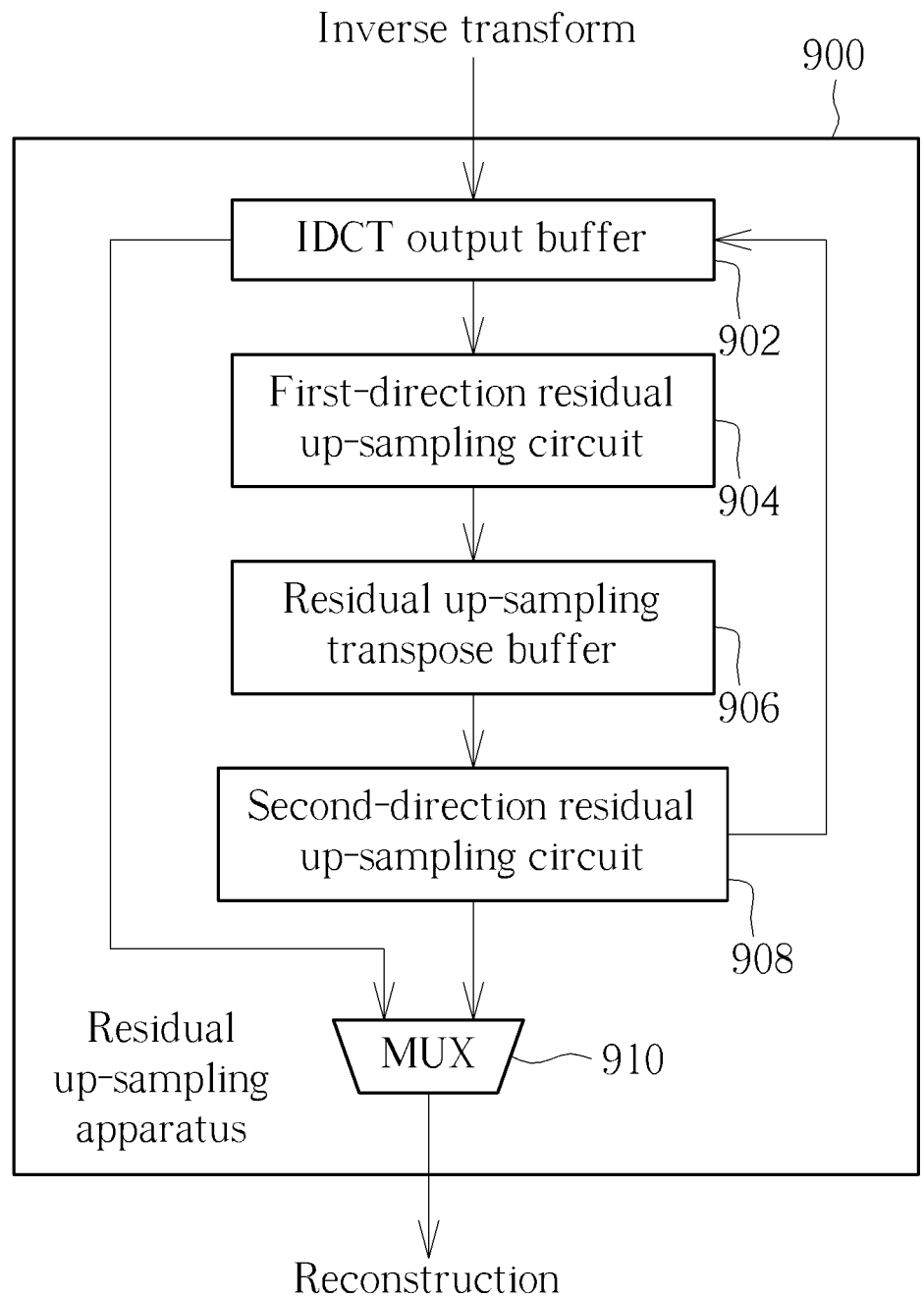
FIG. 9 is a diagram illustrating a high-performance residual up-sampling apparatus according to an embodiment of the present invention.

FIG. 9 is a diagram illustrating a high-performance residual up-sampling apparatus according to an embodiment of the present invention. The residual up-sampling apparatus 410 in the video decoder 400 and/or the residual up-sampling apparatus 520 in the video encoder 500 may be implemented using the residual up-sampling apparatus 900. The residual up-sampling apparatus 900 includes an IDCT output buffer 902, a first-direction residual up-sampling circuit 904, a residual up-sampling transpose buffer 906, a second-direction residual up-sampling circuit 908, and a multiplexer (MUX) 910. The residual up-sampling transpose buffer 906 is arranged to store an intermediate residual up-sampling result. The IDCT output buffer 902 is arranged to store an IDCT output generated from an IDCT circuit (e.g., inverse transform circuit 408 shown in FIG. 4 or inverse transform circuit 518 shown in FIG. 5). The IDCT output buffer 902 may also be used to store a final up-sampling result, depending upon the actual design considerations.

The first-direction residual up-sampling circuit 904 is arranged to process the IDCT output of the IDCT circuit (e.g., inverse transform circuit 408 shown in FIG. 4 or inverse transform circuit 518 shown in FIG. 5) to generate the intermediate residual up-sampling result to the residual up-sampling transpose buffer 906. The second-direction residual up-sampling circuit 908 is arranged to perform transpose access upon the residual up-sampling transpose buffer 906 to retrieve the intermediate residual up-sampling result, and process the intermediate residual up-sampling result to generate a final residual up-sampling result. In one exemplary design, the first-direction residual up-sampling circuit 904 may be a vertical up-sampling circuit, and the second-direction residual up-sampling circuit 908 may be a horizontal up-sampling circuit. In another exemplary design, the first-direction residual up-sampling circuit 904 may be a horizontal up-sampling circuit, and the second-direction residual up-sampling circuit 908 may be a vertical up-sampling circuit.

In this embodiment, the residual up-sampling apparatus 900 employs a high-performance residual up-sampling design that have two separate circuits (i.e., first-direction residual up-sampling circuit 904 and second-direction residual up-sampling circuit 908) for supporting parallel processing of vertical and horizontal up-sampling. For example, one of the first-direction residual up-sampling circuit 904 and the second-direction residual up-sampling circuit 908 may start processing residuals of a transform block before another of the first-direction residual up-sampling circuit 904 and the second-direction residual up-sampling circuit 908 finishes processing residuals of the transform block; and/or one of the first-direction residual up-sampling circuit 904 and the second-direction residual up-sampling circuit 908 may start processing residuals of one transform block before another of the first-direction residual up-sampling circuit 904 and the second-direction residual up-sampling circuit 908 finishes processing residuals of another transform block.

Figure 10:
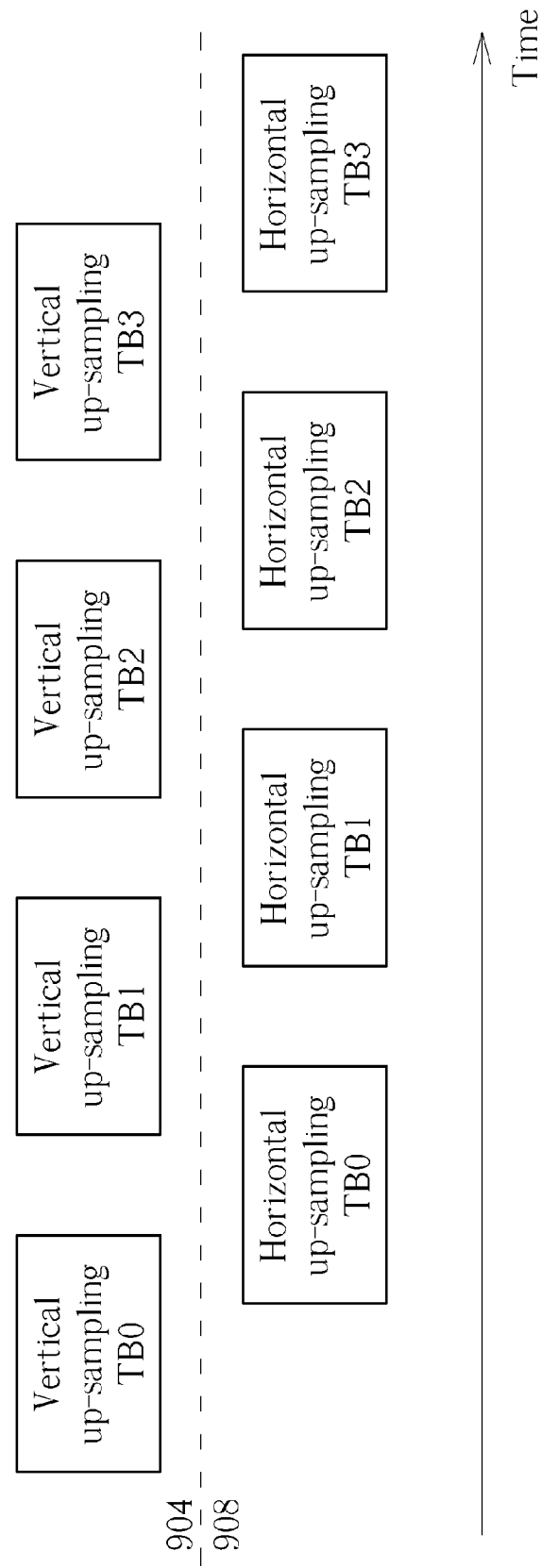
FIG. 10 is a diagram illustrating parallel processing of vertical and horizontal up-sampling according to an embodiment of the present invention.

FIG. 10 is a diagram illustrating parallel processing of vertical and horizontal up-sampling according to an embodiment of the present invention. Suppose that the first-direction residual up-sampling circuit 904 is arranged to perform vertical up-sampling, and the second-direction residual up-sampling circuit 908 is arranged to perform horizontal up-sampling. In one exemplary design, the vertical up-sampling operation is to process from the left-most residual column to the right-most residual column of a transform block, and the horizontal up-sampling operation is to process from the top-most residual row to the bottom-most residual row of a transform block. When the first-direction residual up-sampling circuit (e.g., vertical up-sampling circuit) 904 generates the top-most up-sampled residual in the right-most residual column of a vertically up-sampled transform block (which will be an intermediate up-sampling result), the top-most residual row of the vertically up-sampled transform block is fully available now. At this moment, the second-direction residual up-sampling circuit (e.g., horizontal up-sampling circuit) 908 may start processing the top-most residual row of the vertically up-sampled transform block to generate the top-most residual row of a horizontally up-sampled transform block (which will be a final up-sampling result). Hence, before the first-direction residual up-sampling circuit (e.g., vertical up-sampling circuit) 904 generates the bottom-most up-sampled residual in the right-most residual column of the vertically up-sampled transform block (which will be the intermediate up-sampling result), the second-direction residual up-sampling circuit (e.g., horizontal up-sampling circuit) 908 can start processing one available residual row of the vertically up-sampled transform block to generate one residual row of the horizontally up-sampled transform block (which will be the final up-sampling result). In this way, the first-direction residual up-sampling circuit 904 and the second-direction residual up-sampling circuit 908 perform parallel processing of vertical and horizontal up-sampling associated with the same transform block to be up-converted. In other words, the processing time of vertical up-sampling associated with a transform block (e.g., TB0) is overlapped with the processing time of horizontal up-sampling associated with the same transform block (e.g., TB0), as illustrated in FIG. 10.

Further, when the first-direction residual up-sampling circuit (e.g., vertical up-sampling circuit) 904 generates the bottom-most up-sampled residual in the right-most residual column of the vertically up-sampled transform block (which will be the intermediate up-sampling result), the bottom-most residual row of the vertically up-sampled transform block is fully available now and waits for further processing of the second-direction residual up-sampling circuit (e.g., horizontal up-sampling circuit) 908. At this moment, the first-direction residual up-sampling circuit (e.g., vertical up-sampling circuit) 904 may start processing the left-most column of a next transform block to be up-sampled. Hence, before the second-direction residual up-sampling circuit (e.g., horizontal up-sampling circuit) 908 generates the right-most up-sampled residual in the bottom-most residual row of the horizontally up-sampled transform block (which will be the final up-sampling result), the first-direction residual up-sampling circuit (e.g., vertical up-sampling circuit) 904 can start processing one available residual column of a next transform block. In this way, the first-direction residual up-sampling circuit 904 and the second-direction residual up-sampling circuit 908 perform parallel processing of vertical and horizontal up-sampling associated with different transform blocks to be up-sampled. In other words, the processing time of vertical up-sampling associated with one transform block (e.g., TB1) is overlapped with the processing time of horizontal up-sampling associated with another transform block (e.g., TB0), as illustrated in FIG. 10.

The multiplexer 910 in FIG. 9 is arranged to control the output data path of the final up-sampling result. In one exemplary design, the second-direction residual up-sampling circuit 908 is arranged to store the final residual up-sampling result in the IDCT output buffer 902, and the multiplexer 910 is controlled to allow the IDCT output buffer 902 to output the final residual up-sampling result to a reconstruction circuit (e.g., reconstruction circuit 420 shown in FIG. 4 or reconstruction circuit 522 shown in FIG. 5). In another exemplary design, the second-direction residual up-sampling circuit 908 is arranged to output the final residual up-sampling result to a reconstruction circuit (e.g., reconstruction circuit 420 shown in FIG. 4 or reconstruction circuit 522 shown in FIG. 5) without storing the final residual up-sampling result into the IDCT output buffer 902. The multiplexer 910 is therefore controlled to allow the second-direction residual up-sampling circuit 908 to directly output the final residual up-sampling result to the reconstruction circuit.

Figure 11:
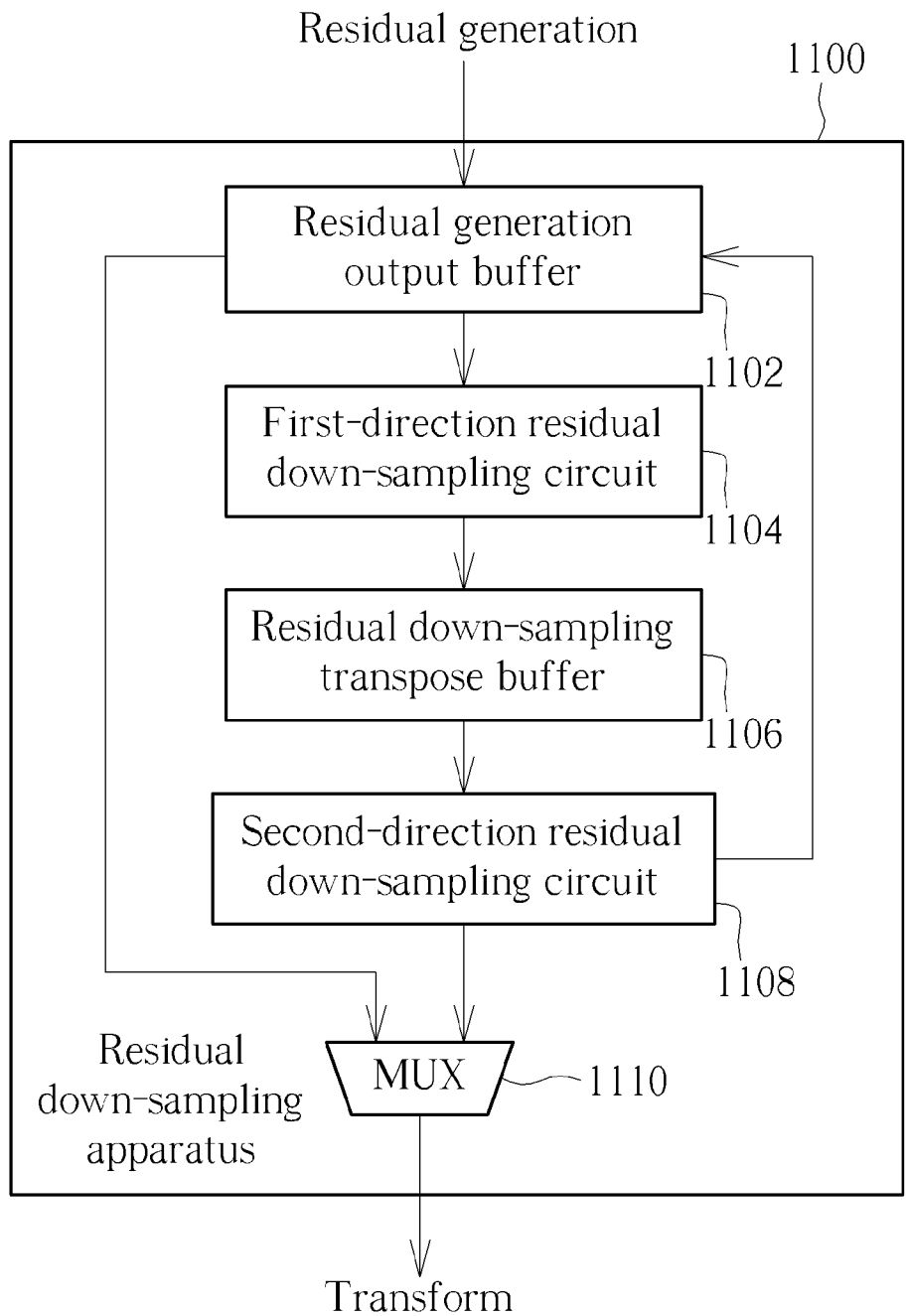
FIG. 11 is a diagram illustrating a high-performance residual down-sampling apparatus according to an embodiment of the present invention.

FIG. 11 is a diagram illustrating a high-performance residual down-sampling apparatus according to an embodiment of the present invention. The residual down-sampling apparatus 504 in the video encoder 500 may be implemented using the residual down-sampling apparatus 1100. The residual down-sampling apparatus 1100 includes a residual generation output buffer 1102, a first-direction residual down-sampling circuit 1104, a residual down-sampling transpose buffer 1106, a second-direction residual down-sampling circuit 1108, and a multiplexer (MUX) 1110. The residual down-sampling transpose buffer 1106 is arranged to store an intermediate residual down-sampling result. The residual generation output buffer 1102 is arranged to store a residual generation output generated from a residual generation circuit (e.g., residual generation circuit 502 shown in FIG. 5). The residual generation output buffer 1102 may also be used to store a final down-sampling result, depending upon the actual design considerations.

The first-direction residual down-sampling circuit 1104 is arranged to process the residual generation output of the residual generation circuit (e.g., residual generation circuit 502 shown in FIG. 5) to generate the intermediate residual down-sampling result to the residual down-sampling transpose buffer 1106. The second-direction residual down-sampling circuit 1108 is arranged to perform transpose access upon the residual down-sampling transpose buffer 1106 to retrieve the intermediate residual down-sampling result, and process the intermediate residual down-sampling result to generate a final residual down-sampling result. In one exemplary design, the first-direction residual down-sampling circuit 1104 may be a horizontal down-sampling circuit, and the second-direction residual down-sampling circuit 1108 may be a vertical down-sampling circuit. In another exemplary design, the first-direction residual down-sampling circuit 1104 may be a vertical down-sampling circuit, and the second-direction residual down-sampling circuit 1108 may be a horizontal down-sampling circuit.

In this embodiment, the residual down-sampling apparatus 1100 employs a high-performance residual down-sampling design that have two separate circuits (i.e., first-direction residual down-sampling circuit 1104 and second-direction residual down-sampling circuit 1108) for supporting parallel processing of vertical and horizontal down-sampling. For example, one of the first-direction residual down-sampling circuit 1104 and the second-direction residual down-sampling circuit 1108 may start processing residuals of a transform block before another of the first-direction residual down-sampling circuit 1104 and the second-direction residual down-sampling circuit 1108 finishes processing residuals of the transform block; and/or one of the first-direction residual down-sampling circuit 1104 and the second-direction residual down-sampling circuit 1108 may start processing residuals of one transform block before another of the first-direction residual down-sampling circuit 1104 and the second-direction residual down-sampling circuit 1108 finishes processing residuals of another transform block.

Figure 12:
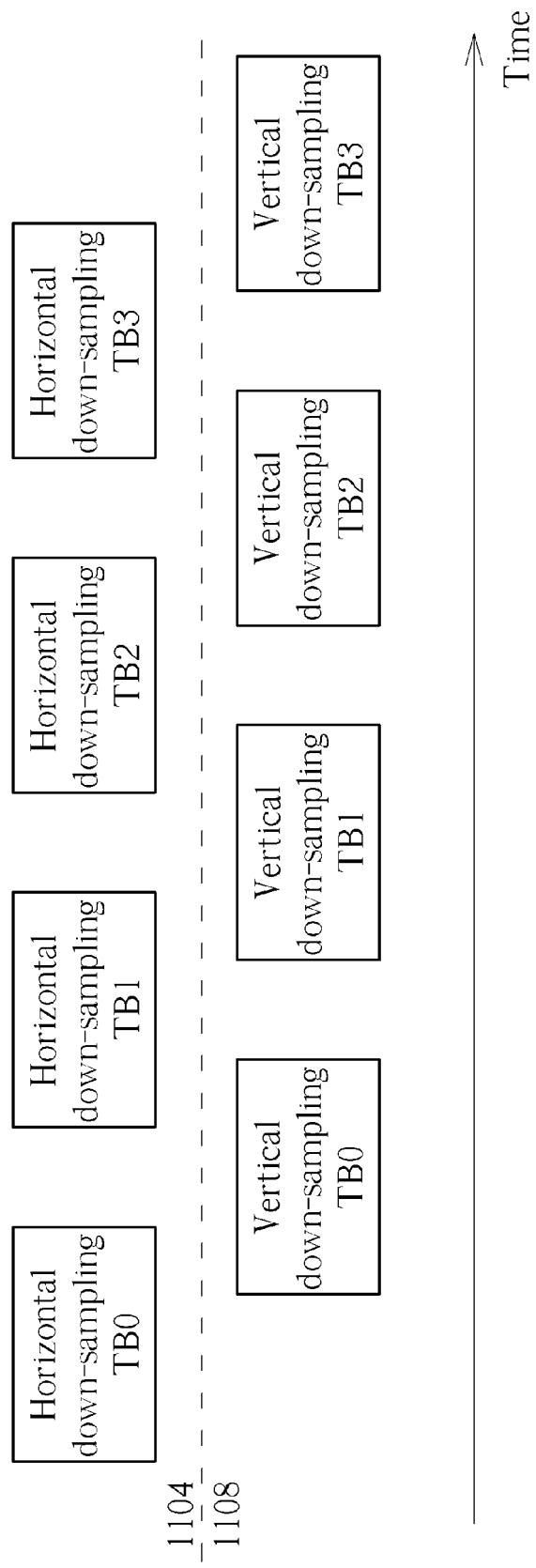
FIG. 12 is a diagram illustrating parallel processing of vertical and horizontal down-sampling according to an embodiment of the present invention.

FIG. 12 is a diagram illustrating parallel processing of vertical and horizontal down-sampling according to an embodiment of the present invention. Suppose that the first-direction residual down-sampling circuit 1104 is arranged to perform horizontal down-sampling, and the second-direction residual down-sampling circuit 1108 is arranged to perform vertical down-sampling. In one exemplary design, the vertical down-sampling operation is to process from the left-most residual column to the right-most residual column of a transform block, and the horizontal down-sampling operation is to process from the top-most residual row to the bottom-most residual row of a transform block. When the first-direction residual down-sampling circuit (e.g., horizontal down-sampling circuit) 1104 generates the left-most up-sampled residual in the bottom-most residual row of a horizontally down-sampled transform block (which will be an intermediate down-sampling result), the left-most residual column of the horizontally up-sampled transform block is fully available now. At this moment, the second-direction residual down-sampling circuit (e.g., vertical down-sampling circuit) 1108 may start processing the left-most residual column of the horizontally up-sampled transform block to generate the left-most residual column of a vertically down-sampled transform block (which will be a final down-sampling result). Hence, before the first-direction residual down-sampling circuit (e.g., horizontal down-sampling circuit) 1104 generates the right-most up-sampled residual in the bottom-most residual row of the horizontally down-sampled transform block (which will be the intermediate down-sampling result), the second-direction residual down-sampling circuit (e.g., vertical down-sampling circuit) 1108 can start processing one available residual column of the horizontally up-sampled transform block to generate one residual column of the vertically up-sampled transform block (which will be the final down-sampling result). In this way, the first-direction residual down-sampling circuit 1104 and the second-direction residual down-sampling circuit 1108 perform parallel processing of vertical and horizontal down-sampling associated with the same transform block to be down-converted. In other words, the processing time of horizontal down-sampling associated with a transform block (e.g., TB0) is overlapped with the processing time of vertical down-sampling associated with the same transform block (e.g., TB0), as illustrated in FIG. 12.

Further, when the first-direction residual down-sampling circuit (e.g., horizontal down-sampling circuit) 1104 generates the right-most up-sampled residual in the bottom-most residual row of the horizontally up-sampled transform block (which will be the intermediate down-sampling result), the right-most residual column of the horizontally up-sampled transform block is fully available now and waits for further processing of the second-direction residual up-sampling circuit (e.g., vertical down-sampling circuit) 1108. At this moment, the first-direction residual down-sampling circuit (e.g., horizontal down-sampling circuit) 1104 may start processing the top-most row of a next transform block to be up-sampled. Hence, before the second-direction residual down-sampling circuit (e.g., vertical down-sampling circuit) 1108 generates the bottom-most residual in the right-most residual row of the vertically up-sampled transform block (which will be the final down-sampling result), the first-direction residual down-sampling circuit (e.g., horizontal down-sampling circuit) 1104 can start processing one available residual row of a next transform block. In this way, the first-direction residual down-sampling circuit 1104 and the second-direction residual down-sampling circuit 1108 perform parallel processing of vertical and horizontal down-sampling associated with different transform blocks to be down-sampled. In other words, the processing time of vertical down-sampling associated with one transform block (e.g., TB0) is overlapped with the processing time of horizontal down-sampling associated with another transform block (e.g., TB1), as illustrated in FIG. 12.

The multiplexer 1110 in FIG. 11 is arranged to control the output data path of the final down-sampling result. In one exemplary design, the second-direction residual down-sampling circuit 1108 is arranged to store the final residual down-sampling result in the residual generation output buffer 1102, and the multiplexer 1110 is controlled to allow the residual generation output buffer 1102 to output the final residual down-sampling result to a transform circuit (e.g., transform circuit 506 shown in FIG. 5). In another exemplary design, the second-direction residual down-sampling circuit 1108 is arranged to output the final residual down-sampling result to a transform circuit (e.g., transform circuit 506 shown in FIG. 5) without storing the final residual down-sampling result into the residual generation output buffer 1102. The multiplexer 1110 is therefore controlled to allow the second-direction residual down-sampling circuit 1108 to directly output the final residual down-sampling result to the transform circuit.

Figure 13:
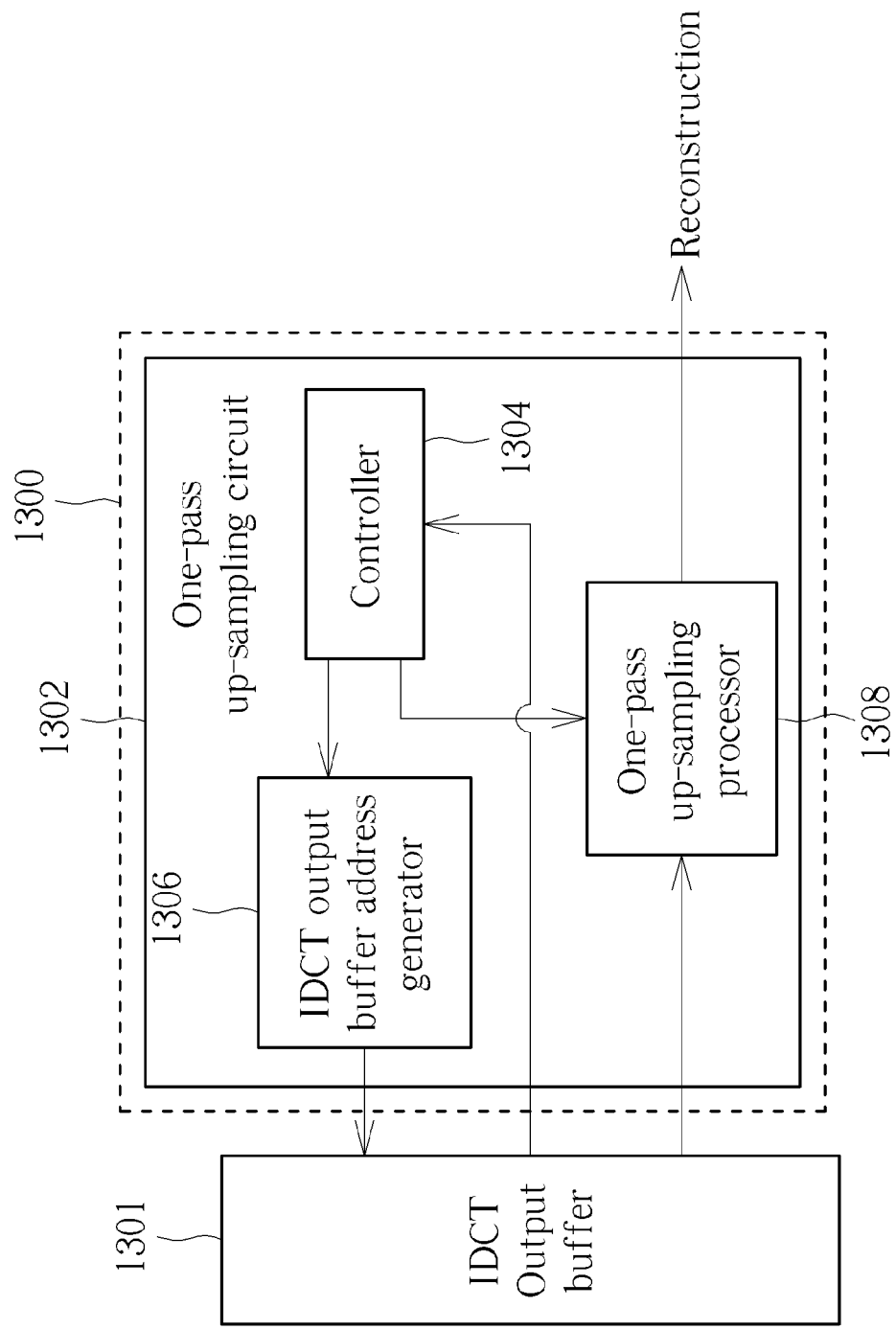
FIG. 13 is a diagram illustrating a low-cost and high-performance residual up-sampling apparatus according to an embodiment of the present invention.

FIG. 13 is a diagram illustrating a low-cost and high-performance residual up-sampling apparatus according to an embodiment of the present invention. The residual up-sampling apparatus 410 in the video decoder 400 and/or the residual up-sampling apparatus 520 in the video encoder 500 may be implemented using the residual up-sampling apparatus 1300. The residual up-sampling apparatus 1300 is coupled to an IDCT output buffer 1301. The IDCT output buffer 902 is arranged to store an IDCT output generated from an IDCT circuit (e.g., inverse transform circuit 408 shown in FIG. 4 or inverse transform circuit 518 shown in FIG. 5). The residual up-sampling apparatus 1300 includes a one-pass up-sampling circuit 1302 arranged to perform a one-pass two-dimensional (2D) up-sampling operation upon the IDCT output of the IDCT circuit (e.g., inverse transform circuit 408 shown in FIG. 4 or inverse transform circuit 518 shown in FIG. 5) to output a plurality of up-sampled residuals one by one, wherein the one-pass 2D up-sampling operation has a first-direction residual up-sampling operation and a second-direction residual up-sampling operation merged without transpose access. The first-direction residual up-sampling operation and the second-direction residual up-sampling operation merged in the one-pass 2D up-sampling operation include a vertical up-sampling operation and a horizontal up-sampling operation. Hence, when a one-pass 2D up-sampling process is performed upon one or more residuals of a transform block to be up-sampled, a vertical up-sampling process and a horizontal up-sampling process are performed at once to thereby calculate and output one up-sampled residual of a final residual up-sampling result on the fly. It should be noted that the residual data generated from the one-pass 2D up-sampling process may be directly sent to a reconstruction circuit without being fed back to the IDCT output buffer 1301. Further, no transpose buffer is needed for storing any intermediate up-sampling result generated by one down-sampling operation and then processed by another down-sampling operation. Therefore, the residual up-sampling apparatus 1300 employs a low-cost and high-performance residual up-sampling design. For example, the residual up-sampling apparatus 1300 performs one-pass up-sampling to thereby achieve high performance, and needs no transpose buffer for storing an intermediate up-sampling result to thereby achieve low cost.

In this embodiment, the one-pass up-sampling circuit 1302 includes an IDCT output buffer address generator 1306, a controller 1304, and a one-pass up-sampling processor 1308. The controller 1304 is arranged to control operations of the IDCT output buffer address generator 1306 and the one-pass up-sampling processor 1308. The IDCT output buffer address generator 1306 is arranged to generate an IDCT output buffer address to the IDCT output buffer 1301 for retrieving residuals needed by the one-pass 2D up-sampling operation. The one-pass up-sampling processor 1308 is arranged to perform the one-pass 2D up-sampling operation upon residual data that are read from the IDCT output buffer 1301 in response to the IDCT output buffer address decided by the IDCT output buffer address generator 1306.

For example, the IDCT output buffer address generator 1306 may decide the IDCT output buffer address according to decode information, and the one-pass up-sampling processor 1308 may configure the one-pass 2D up-sampling operation according to the decode information. The decode information may include the current process spatial position, the TB size (which includes the TB width and the TB height), transform_splt_flag, TransformSplitDirection, etc. The decode information can be obtained from any block in the video decoder (or video encoder) using the one-pass up-sampling circuit 1302 as the residual up-sampling circuit. For example, the decode information can be obtained from an entropy decoder and/or a reconstruction circuit. For example, the number of residuals N needed by the one-pass 2D up-sampling operation can be determined according to the decode information such as the current process spatial position (X, Y), the TB width (w), the TB height (h), transform_splt_flag (S), and TransformSplitDirection (D). For example, N=1 if {X, Y, W, H, S, D}={0, 0, 32, 32, 0, N.A.}. For another example, N=2 if {X, Y, W, H, S, D}={1, 0, 32, 32, 0, N.A.}. For yet another example, N=4 if {X, Y, W, H, S, D}={1, 1, 32, 32, 0, N.A.}.

Figure 14:
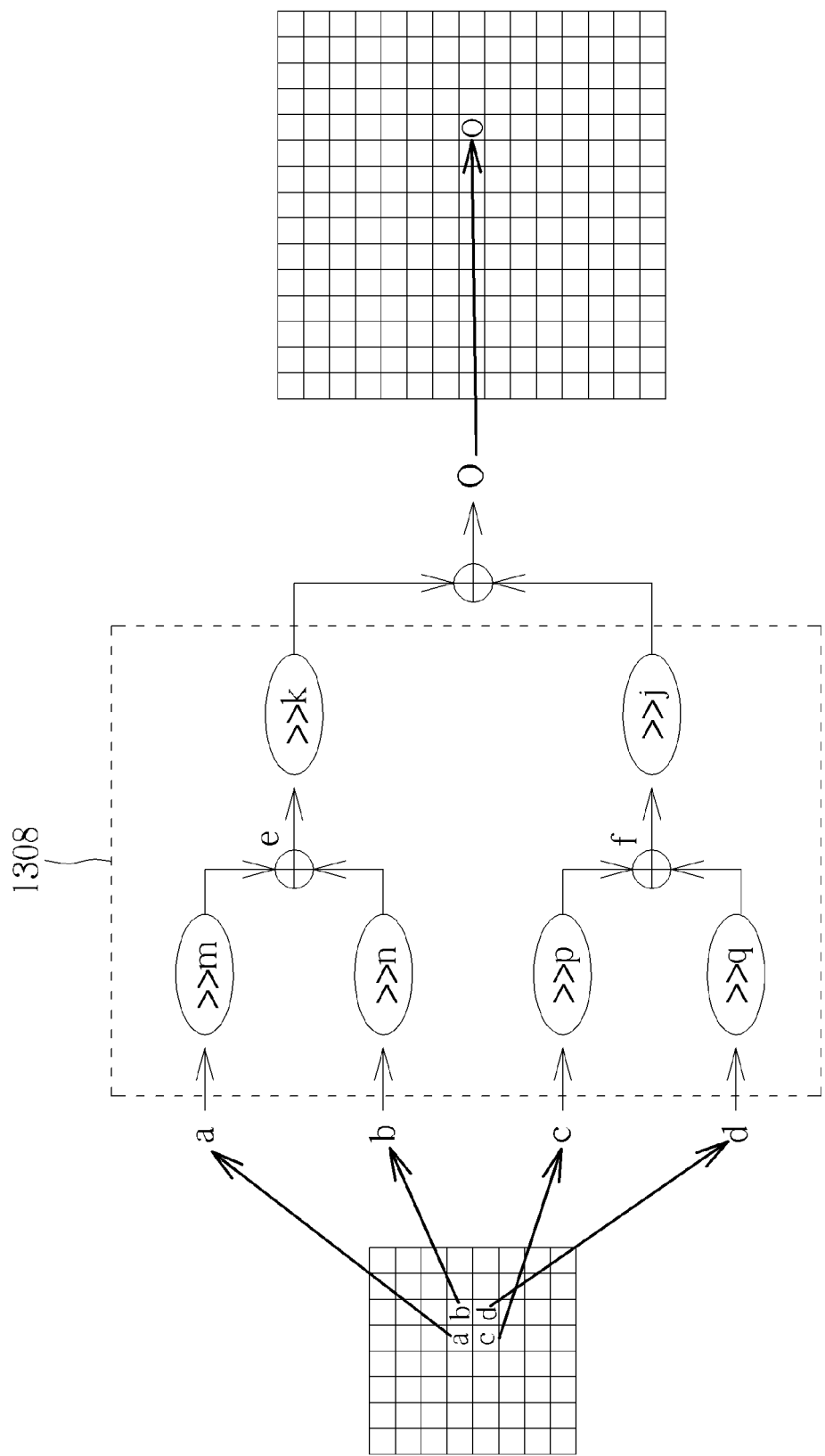
FIG. 14 is a diagram illustrating a one-pass 2D up-sampling operation performed by a one-pass up-sampling processor according to an embodiment of the present invention.

FIG. 14 is a diagram illustrating a one-pass 2D up-sampling operation performed by the one-pass up-sampling processor 1308 according to an embodiment of the present invention. The residual data generated by one-pass 2D up-sampling is a function of residual data read from the IDCT output buffer 1301. The computation of the function depends on the decode information such as the current process spatial position, the TB size, transform_splt_flag, and TransformSplitDirection. For example, residual data 0 can be calculated according to the one-pass 2D up-sampling function F(a, b, c, d) as below:

O=F (a, b, c, d)=((a»»»m+b»»»n)»»»k+(c»»»p+d»»»q)»»»j)»»»I where "a", "b", "c" and "d" are four residuals read from the IDCT output buffer 1301 and used for one-pass 2D up-sampling process, "»»" is a right bit-shift operator, and "m", "n", "p", "q", "I", "j", "k" are constant values.

It should be noted that a register (not shown) may be used to store an intermediate output and/or an output of the one-pass 2D up-sampling process. For example, the residual data "O" can be temporarily stored in a register and then output to the reconstruction circuit. For another example, the intermediate data "e" and "f" can be temporarily stored in a register and then output to respective right bit-shift operators. However, this is for illustrative purposes only, and is not meant to be a limitation of the present invention. That is, the register is optional and may be omitted in some embodiments of the present invention.

Figure 15:
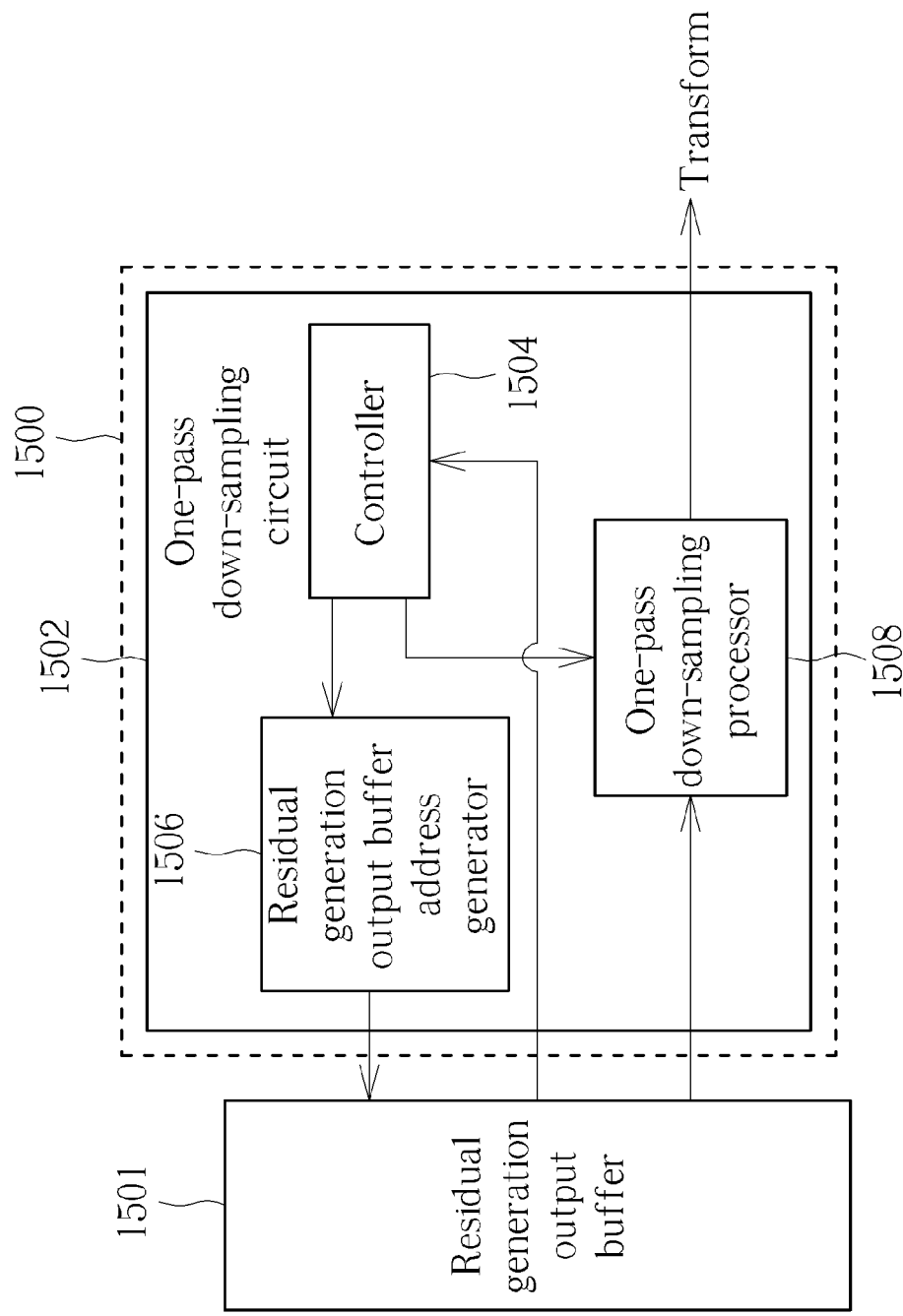
FIG. 15 is a diagram illustrating a low-cost and high-performance residual down-sampling apparatus according to an embodiment of the present invention.

FIG. 15 is a diagram illustrating a low-cost and high-performance residual down-sampling apparatus according to an embodiment of the present invention. The residual down-sampling apparatus 504 in the video encoder 500 may be implemented using the residual down-sampling apparatus 1500. The residual down-sampling apparatus 1500 is coupled to a residual generation output buffer 1501. The residual generation output buffer 1501 is arranged to store a residual generation output generated from a residual generation circuit (e.g., residual generation circuit 501 shown in FIG. 5). The residual down-sampling apparatus 1500 includes a one-pass down-sampling circuit 1502 arranged to perform a one-pass two-dimensional (2D) down-sampling operation upon the residual generation output of the residual generation circuit (e.g., residual generation circuit 502 shown in FIG. 5) to output a plurality of down-sampled residuals one by one, wherein the one-pass 2D down-sampling operation has a first-direction residual down-sampling operation and a second-direction residual down-sampling operation merged without transpose access. The first-direction residual down-sampling operation and the second-direction residual down-sampling operation merged in the one-pass 2D down-sampling operation include a vertical down-sampling operation and a horizontal down-sampling operation. Hence, when a one-pass 2D down-sampling process is performed upon one or more residuals of a transform block to be down-sampled, a vertical down-sampling process and a horizontal down-sampling process are performed at once to thereby calculate and output one down-sampled residual of a final residual down-sampling result on the fly. It should be noted that the residual data generated from the one-pass 2D down-sampling process may be directly sent to a transform circuit without being fed back to the residual generation output buffer 1501. Further, no transpose buffer is needed for storing any intermediate down-sampling result generated by one down-sampling operation and then processed by another down-sampling operation. Therefore, the residual down-sampling apparatus 1500 employs a low-cost and high-performance residual down-sampling design. For example, the residual down-sampling apparatus 1500 performs one-pass down-sampling to thereby achieve high performance, and needs no transpose buffer for storing an intermediate down-sampling result to thereby achieve low cost.

In this embodiment, the one-pass down-sampling circuit 1502 includes a residual generation output buffer address generator 1506, a controller 1504, and a one-pass down-sampling processor 1508. The controller 1504 is arranged to control operations of the residual generation output buffer address generator 1506 and the one-pass down-sampling processor 1508. The residual generation output buffer address generator 1506 is arranged to generate a residual generation output buffer address to the residual generation output buffer 1501 for retrieving residuals needed by the one-pass 2D down-sampling operation. The one-pass down-sampling processor 1508 is arranged to perform the one-pass 2D down-sampling operation upon residual data that are read from the residual generation output buffer 1501 in response to the residual generation output buffer address decided by the residual generation output buffer address generator 1506.

For example, the residual generation output buffer address generator 1506 may decide the residual generation output buffer address according to encode information, and the one-pass down-sampling processor 1508 may configure the one-pass 2D down-sampling operation according to the encode information. The encode information may include the current process spatial position, the TB size including the TB width and the TB height, transform_splt_flag, TransformSplitDirection, etc. The encode information can be obtained from any block in the video encoder using the one-pass down-sampling circuit 1502 as the residual down-sampling circuit. For example, the encode information can be obtained from an entropy encoder and/or a residual generation circuit. For example, the number of residuals N needed by the one-pass 2D down-sampling operation can be determined according to the encode information such as the current process spatial position (X, Y), the TB width (w), the TB height (h), transform_splt_flag (S), and TransformSplitDirection (D). For example, N=1 if {X, Y, W, H, S, D}={0, 0, 64, 64, 0, N.A.}. For another example, N=2 if {X, Y, W, H, S, D}={1, 0, 64, 64, 0, N.A.}. For yet another example, N=4 if {X, Y, W, H, S, D}={1, 1, 64, 64, 0, N.A.}.

The largest TB size in AVS2 coding standard is 64×64, while the largest TB size in other typical coding standards may be 32×32. Hence, the residual up-sampling/down-sampling flow employed by the AVS2 coding standard may not be backward compatible with a video encoder/decoder design of a typical video coding standard. To reduce the design complexity, cost and power consumption in the video decoder/encoder implementation, the present invention further proposes partitioning a decode/encode flow with residual up-sampling/down-sampling in the luma (Y) transform block (TB) into several parts and re-ordering the decode/encode flow. Specifically, one TB to be up-sampled/down-sampled is divided into several TB partitions (i.e., smaller-sized partitioned TBs), and TB partitions of different TBs to be up-sampled/down-sampled are processed in a particular order proposed by the present invention.

Figure 16:
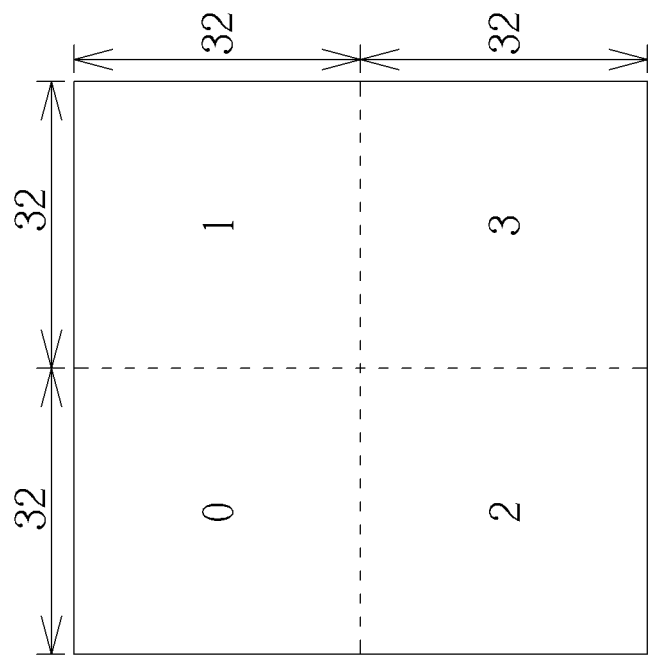
FIG. 16 is a diagram illustrating the residual up-sampling and down-sampling applied to smaller-sized partitioned TBs in scenario 1.
Figure 16:
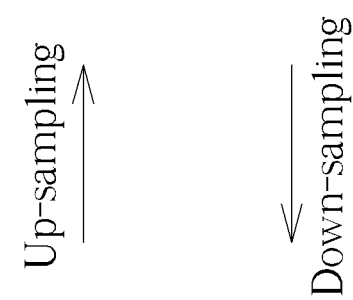
Figure 16:
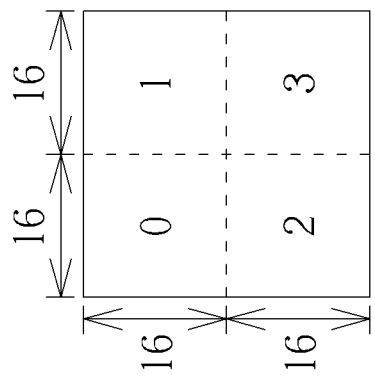

FIG. 16 is a diagram illustrating the residual up-sampling and down-sampling applied to smaller-sized partitioned TBs in scenario 1 (Transform_split_flag="0", TransformSplitDirection="N.A." and Direction="N.A."). With regard to the residual up-sampling, one original 32×32 TB is partitioned into 4×(16×16) TBs, and the up-sampling order of the four 16×16 TB partitions is 0→1→2→3. Hence, 4×(32×32) TBs are generated by the residual up-sampling (which includes vertical up-sampling and horizontal up-sampling) in the output order 0→1→2→3. In other words, a reconstruction circuit (e.g., reconstruction circuit 420 shown in FIG. 4 or reconstruction circuit 522 shown in FIG. 5) which supports a TB size of 32×32 can sequentially process the 32×32 TBs in the reconstruction order 0→1→2→3.

With regard to the residual down-sampling, one original 64×64 TB is partitioned into 4×(32×32) TBs, and the down-sampling order of the four 32×32 TB partitions is 0→1→2→3. Hence, 4×(16×16) TBs are generated by the residual down-sampling (which includes horizontal down-sampling and vertical down-sampling) in the output order 0→1→2→3. In other words, an intra prediction circuit (e.g., intra prediction circuit 412 shown in FIG. 4 or intra prediction circuit 532 shown in FIG. 5) which supports a TB size of 32×32 can sequentially perform intra prediction used for deciding residuals of the 32×32 TBs in the intra prediction order 0→1→2→3, and an inter prediction circuit (e.g., motion vector generation circuit 414 and motion compensation circuit 416 shown in FIG. 4, or motion vector generation circuit 528 and motion compensation circuit 530 shown in FIG. 5) which supports a TB size of 32×32 can sequentially perform inter prediction used for deciding residuals of the 32×32 TBs in the inter prediction order 0→1→2→3.

Figure 17:
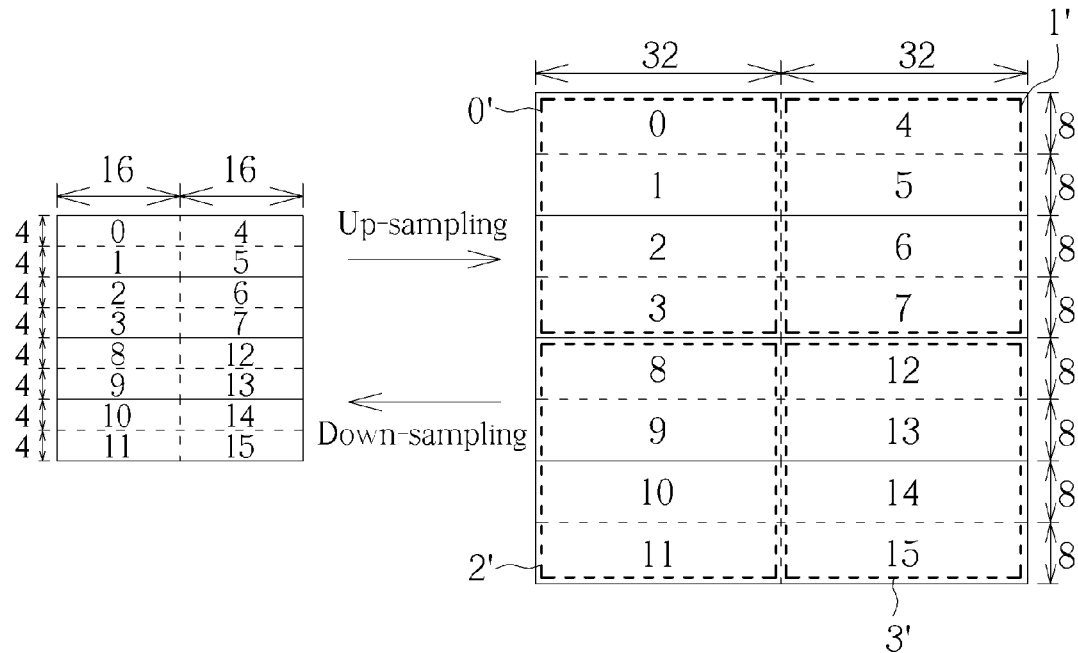
FIG. 17 is a diagram illustrating the residual up-sampling and down-sampling applied to smaller-sized partitioned TBs in scenario 2.

FIG. 17 is a diagram illustrating the residual up-sampling and down-sampling applied to smaller-sized partitioned TBs in scenario (Transform_split_flag="1", TransformSplitDirection="1" and Direction="horizontal"). With regard to the residual up-sampling, original 4×(32×8) TBs are partitioned into 16×(16×4) TBs, and the up-sampling order of the 16×(16×4) TB partitions is 0→1→2→3→ . . . → 12→13→14→15. Hence, 16×(32×8) TBs are generated by the residual up-sampling (which includes vertical up-sampling and horizontal up-sampling) in the output order 0→1→2→3→ . . . →12→13→14→15. In other words, a reconstruction circuit (e.g., reconstruction circuit 420 shown in FIG. 4 or reconstruction circuit 522 shown in FIG. 5) which supports a TB size of 32×32 can sequentially process the 32×32 TBs in the reconstruction order 0'→1'→2'→3'.

With regard to the residual down-sampling, original 4×(64×16) TBs are partitioned into 16×(32×8) TBs, and the down-sampling order of the 16×(32×8) TB partitions is 0→1→2→3→ . . . →12-13→14→15. Hence, 16×(16×4) TBs are generated by the residual down-sampling (which includes horizontal down-sampling and vertical down-sampling) in the output order 0→1→2→3→ . . . → 12→13→14→15. In other words, an intra prediction circuit (e.g., intra prediction circuit 412 shown in FIG. 4 or intra prediction circuit 532 shown in FIG. 5) which supports a TB size of 32×32 can sequentially perform intra prediction used for deciding residuals of the 32×32 TBs in the intra prediction order 0'→1'→2'→3', and an inter prediction circuit (e.g., motion vector generation circuit 414 and motion compensation circuit 416 shown in FIG. 4 or motion vector generation circuit 528 and motion compensation circuit 530 shown in FIG. 5) which supports a TB size of 32×32 can sequentially perform inter prediction used for deciding residuals of the 32×32 TBs in the inter prediction order 0'→1'→2'→3'.

Figure 18:
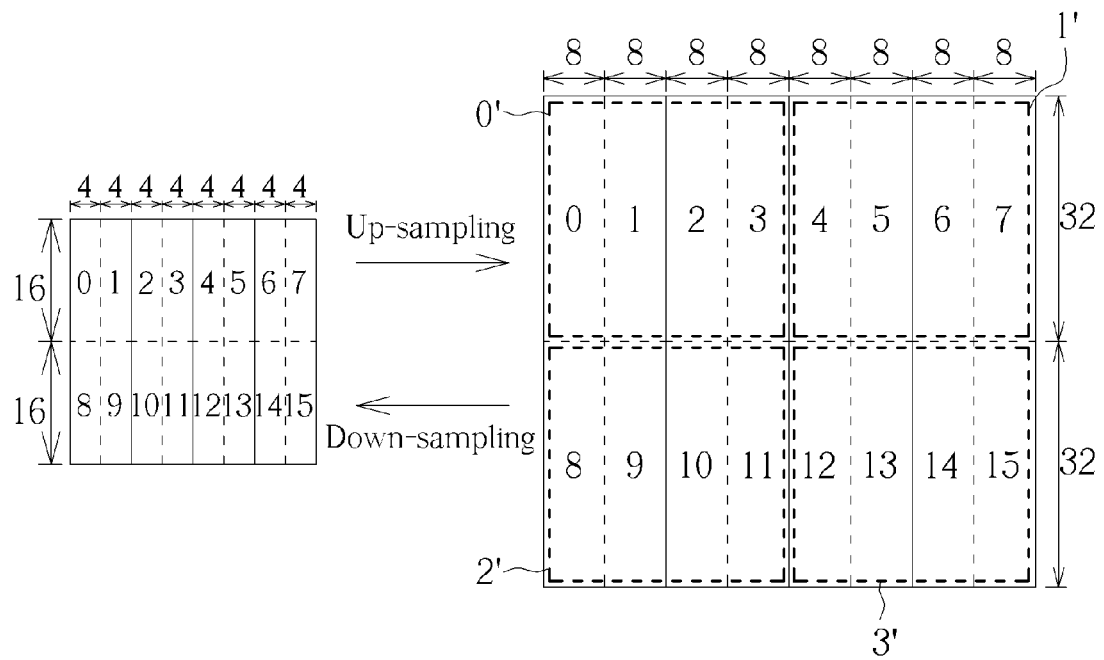
FIG. 18 is a diagram illustrating the residual up-sampling and down-sampling applied to smaller-sized partitioned TBs in scenario 3.

FIG. 18 is a diagram illustrating the residual up-sampling and down-sampling applied to smaller-sized partitioned TBs in scenario 3 (Transform_split_flag="1", TransformSplitDirection="2" and Direction="vertical"). With regard to the residual up-sampling, original 4×(8×32) TBs are partitioned into 16×(4×16) TBs, and the up-sampling order of the 16×(4×16) TB partitions is 0→1→2→3→ . . . → 12→13→14→15. Hence, 16×(8×21) TBs are generated by the residual up-sampling (which includes vertical up-sampling and horizontal up-sampling) in the output order 0→1→2→3→ . . . →12→13→14→15. In other words, a reconstruction circuit (e.g., reconstruction circuit 420 shown in FIG. 4 or reconstruction circuit 522 shown in FIG. 5) which supports a TB size of 32×32 can sequentially process the 32×32 TBs in the reconstruction order 0'→1'→2'→3'.

With regard to the residual down-sampling, original 4×(16×64) TBs are partitioned into 16×(8×32) TBs, and the down-sampling order of the 16×(8×32) TB partitions is 0→1→2→3→ . . . →12→13→14→15. Hence, 16×(4×16) TBs are generated by the residual down-sampling (which includes horizontal down-sampling and vertical down-sampling) in the output order 0→1→2→3→ . . . → 12→13→14→15. In other words, an intra prediction circuit (e.g., intra prediction circuit 412 shown in FIG. 4 or intra prediction circuit 532 shown in FIG. 5) which supports a TB size of 32×32 can sequentially perform intra prediction used for deciding residuals of the 32×32 TBs in the intra prediction order 0'→1'→2'→3', and an inter prediction circuit (e.g., motion vector generation circuit 414 and motion compensation circuit 416 shown in FIG. 4 or motion vector generation circuit 528 and motion compensation circuit 530 shown in FIG. 5) which supports a TB size of 32×32 can sequentially perform inter prediction used for deciding residuals of the 32×32 TBs in the inter prediction order 0'→1'→2'→3'.

Figure 19:
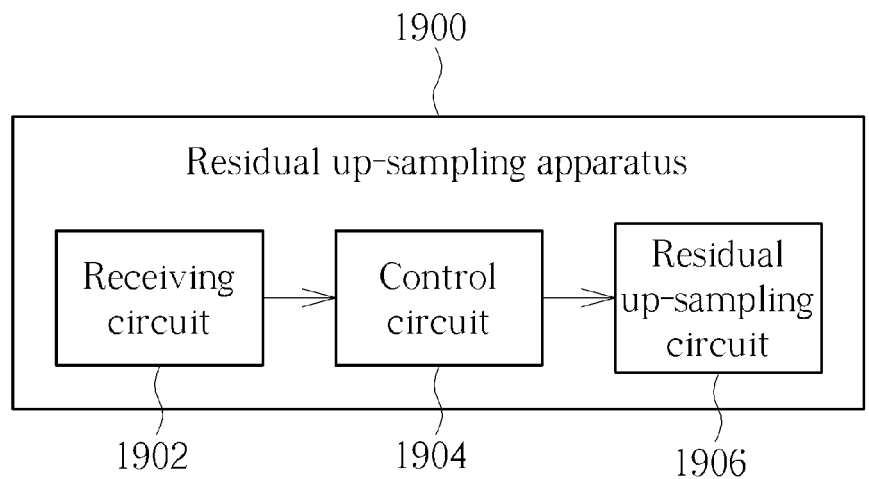
FIG. 19 is a diagram illustrating a partitioned TB based residual up-sampling apparatus according to an embodiment of the present invention.

FIG. 19 is a diagram illustrating a partitioned TB based residual up-sampling apparatus according to an embodiment of the present invention. The residual up-sampling apparatus 410 in the video decoder 400 and/or the residual up-sampling apparatus 520 in the video encoder 500 may be implemented using the residual up-sampling apparatus 1900. In this embodiment, the residual up-sampling apparatus 1900 includes a receiving circuit 1902, a control circuit 1904, and a residual up-sampling circuit 1906. The receiving circuit 1902 is arranged to receive partitioned transform block data from an inverse transform output buffer (not shown), where the inverse transform output buffer is used to store an inverse transform output of an inverse transform circuit (e.g., inverse transform circuit 408 in FIG. 4 or inverse transform circuit 518 in FIG. 5). The residual up-sampling circuit 1906 is arranged to perform a residual up-sampling operation upon the partitioned transform block data gathered by the receiving circuit 1902.

The control circuit 1904 is arranged to control the residual up-sampling flow of smaller-sized partitioned TBs (i.e., TB partitions). For example, the control circuit 1904 determines the timing of triggering the residual up-sampling circuit 1906 to start the residual up-sampling of the partitioned transform block data. In this embodiment, the control circuit 1904 may control the residual up-sampling flow according to information such as the TB size (which includes TB width and TB height), transform_splt_flag, TransformSplitDirection, etc. The information can be obtained from any block in the video decoder (or video encoder). For example, the information can be obtained from an entropy decoder and/or a reconstruction circuit. For another example, the information can be obtained from an entropy encoder and/or a residual generation circuit. In this embodiment, the number of TB partitions (smaller-sized partitioned TBs) N needed to be merged for undergoing residual up-sampling can be determined by the control circuit 1904 according to the TB width (w), the TB height (h), transform_splt_flag (S), and TransformSplitDirection (D). For example, N=1 if {W, H, S, D}={32, 32, 0, N.A.}. For another example, N=4 if {W, H, S, D}={32, 8, 1, 1}. For yet another example, N=4 if {W, H, S, D}={8, 32, 1, 2}.

Figure 20:
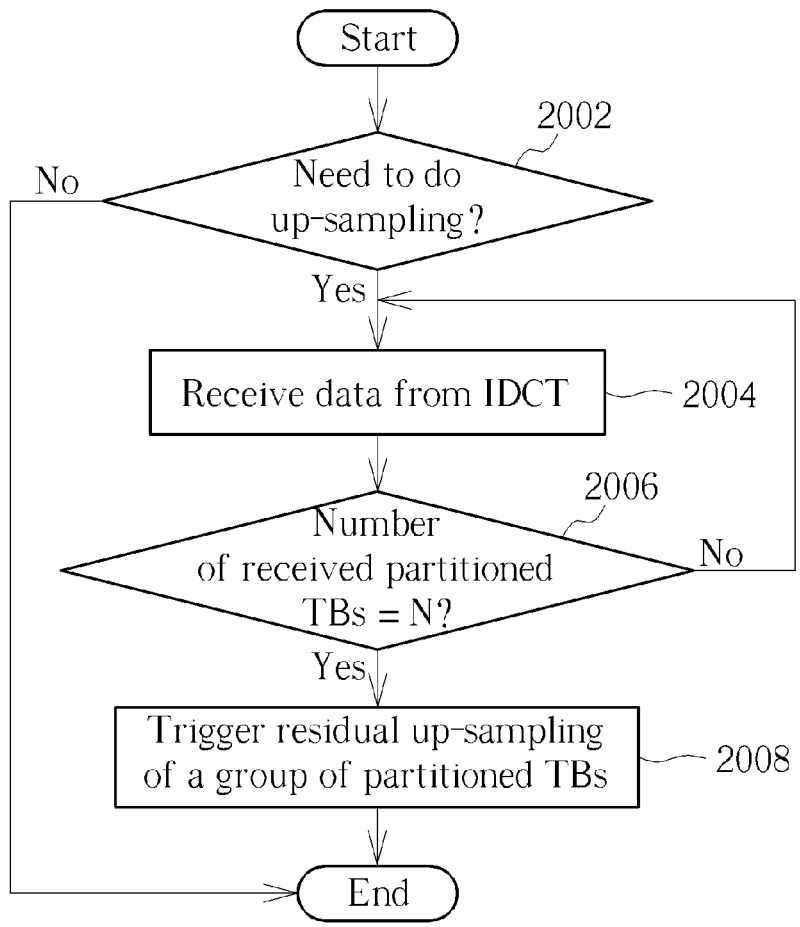
FIG. 20 is a flowchart illustrating a residual up-sampling process of smaller-sized partitioned TBs according to an embodiment of the present invention.

FIG. 20 is a flowchart illustrating a residual up-sampling process of smaller-sized partitioned TBs according to an embodiment of the present invention. At step 2002, the control circuit 1904 checks if the residual up-sampling is needed. For example, the residual up-sampling is needed when CU size=64×64 and one of scenarios 1-3 is selected. In other words, the residual up-sampling is not needed when CU size≠64×64 or CU size=64×64 and scenario 4 is selected. If the control circuit 1904 judges that the residual up-sampling is not needed, the following steps are skipped. If the control circuit 1904 judges that the residual up-sampling is needed, the flow proceeds with step 2004. At step 2004, the control circuit 1904 instructs the receiving circuit 1902 to start retrieving partitioned transform block data (e.g., one 16×16 TB partition in scenario 1, four 16×4 TB partitions in scenario 2, or four 4×16 TB partitions in scenario 3) from the inverse transform output buffer (not shown) for residual up-sampling. It should be noted that the receiving circuit 1902 receives the TB partitions according to the up-sampling order of four 16×16 TB partitions as illustrated in FIG. 16, the up-sampling order of sixteen 16×4 TB partitions as illustrated in FIG. 17, or the up-sampling order of sixteen 4×16 TB partitions as illustrated in FIG. 18. At step 2006, the control circuit 1904 checks if the number of retrieved TB partitions is equal to N. If the number of retrieved TB partitions is not equal to N yet, the flow proceeds with step 2004. If the number of retrieved TB partitions is equal to N, the flow proceeds with step 2008. At step 2008, the control circuit 1904 triggers the residual up-sampling circuit 1906 to perform a residual up-sampling operation upon the gathered TB partition(s).

In this embodiment, the residual up-sampling operation is triggered for processing received TB partition(s) when the number of retrieved TB partitions is equal to N, where N=1 or N=4. However, this is for illustrative purposes only, and is not meant to be a limitation of the present invention. Alternatively, the control circuit 1904 may trigger the residual up-sampling circuit 1906 when one residual column of the N transform block partitions is received and available for vertical up-sampling or one residual row of the N transform block partitions is received and available for horizontal up-sampling.

When the proposed residual up-sampling process of TB partitions is employed by a video decoder/encoder, the 32×32 reconstruction order for residuals in scenario 1/2/3 can be the same as the 32×32 reconstruction order for residuals in scenario 4 and is compatible with other typical videoing coding standards (e.g., VP9). In this way, the complexity, cost and power consumption of the post-stage design, such as in-loop filter(s), can be effectively reduced.

Figure 21:
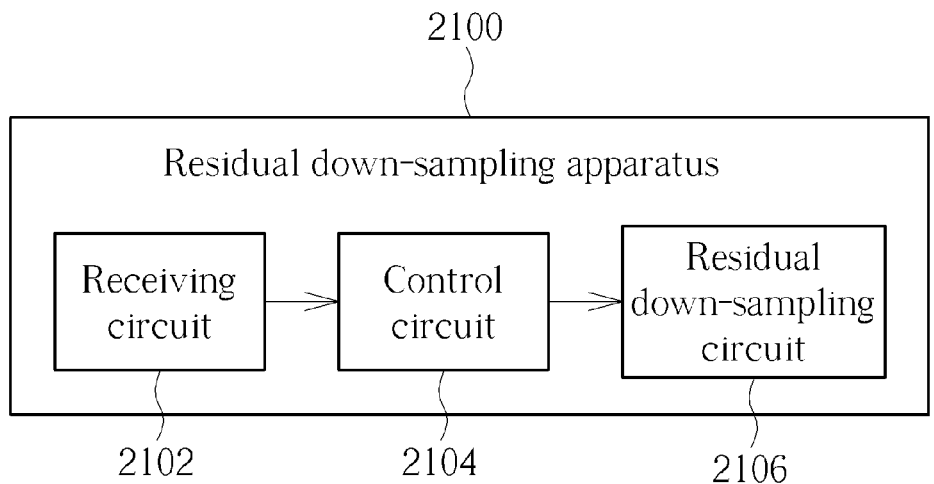
FIG. 21 is a diagram illustrating a partitioned TB based residual down-sampling apparatus according to an embodiment of the present invention.

FIG. 21 is a diagram illustrating a partitioned TB based residual down-sampling apparatus according to an embodiment of the present invention. The residual down-sampling apparatus 504 in the video encoder 500 may be implemented using the residual down-sampling apparatus 2100. In this embodiment, the residual down-sampling apparatus 2100 includes a receiving circuit 2102, a control circuit 2104, and a residual down-sampling circuit 2106. The receiving circuit 2102 is arranged to receive partitioned transform block data from a residual generation output buffer (not shown), where the residual generation output buffer is used to store a residual generation output of a residual generation circuit (e.g., residual generation circuit 502 in FIG. 5). The residual down-sampling circuit 2106 is arranged to perform a residual down-sampling operation upon the partitioned transform block data gathered by the receiving circuit 2102.

The control circuit 2104 is arranged to control the residual down-sampling flow of smaller-sized partitioned TBs (i.e., TB partitions). For example, the control circuit 2104 determines the timing of triggering the residual down-sampling circuit 2106 to start the residual down-sampling of the partitioned transform block data. In this embodiment, the control circuit 2104 may control the residual down-sampling flow according to information such as the TB size (which includes TB width and TB height), transform_splt_flag, TransformSplitDirection, etc. The information can be obtained from any block in the video encoder. For example, the information can be obtained from an entropy encoder and/or a residual generation circuit. In this embodiment, the number of TB partitions (smaller-sized partitioned TBs) N needed to be merged for undergoing residual down-sampling can be determined by the control circuit 2104 according to the TB width (w), the TB height (h), transform_splt_flag (S), and TransformSplitDirection (D). For example, N=1 if {W, H, S, D}={64, 64, 0, N.A.}. For another example, N=4 if {W, H, S, D}={64, 16, 1, 1}. For yet another example, N=4 if {W, H, S, D}={16, 64, 1, 2}.

Figure 22:
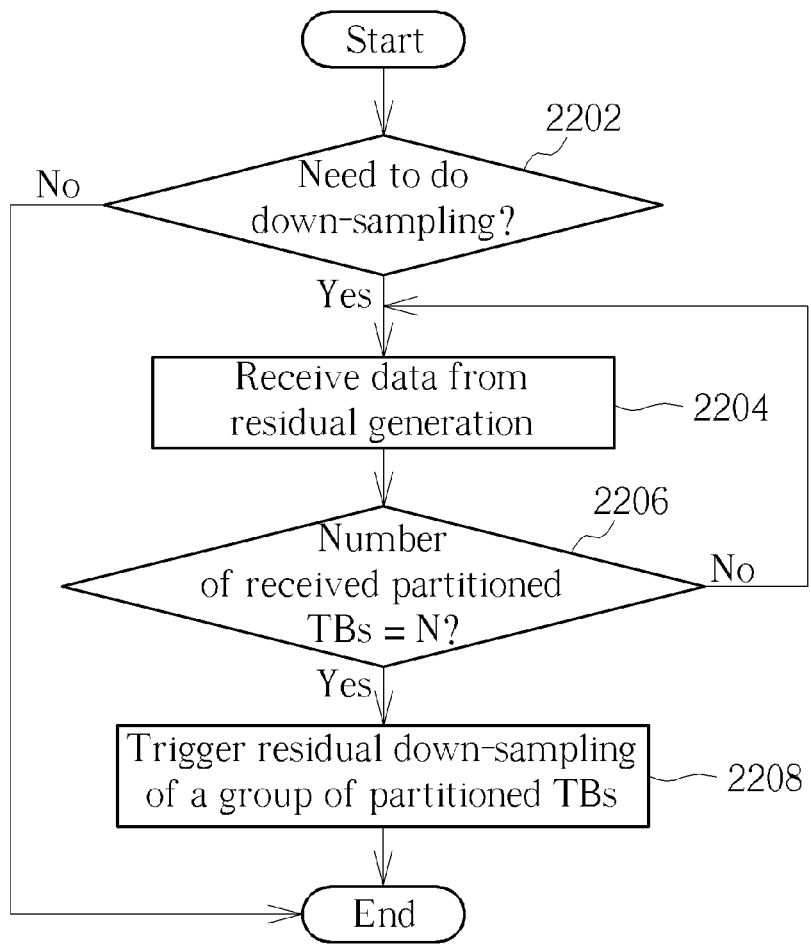
FIG. 22 is a flowchart illustrating a residual down-sampling process of smaller-sized partitioned TBs according to an embodiment of the present invention.

FIG. 22 is a flowchart illustrating a residual down-sampling process of smaller-sized partitioned TBs according to an embodiment of the present invention. At step 2202, the control circuit 2104 checks if the residual down-sampling is needed. For example, the residual down-sampling is needed when CU size=64×64 and one of scenarios 1-3 is selected. In other words, the residual down-sampling is not needed when CU size≠64×64 or CU size=64×64 and scenario 4 is selected. If the control circuit 2104 judges that the residual down-sampling is not needed, the following steps are skipped. If the control circuit 2104 judges that the residual down-sampling is needed, the flow proceeds with step 2204. At step 2204, the control circuit 2104 instructs the receiving circuit 2102 to start retrieving partitioned transform block data (e.g., one 32×32 TB partition in scenario 1, four 32×8 TB partitions in scenario 2, or four 8×32 TB partitions in scenario 3) from the residual generation output buffer (not shown) for residual down-sampling. It should be noted that the receiving circuit 2102 receives the TB partitions according to the down-sampling order of four 32×32 TB partitions as illustrated in FIG. 16, the down-sampling order of sixteen 32×8 TB partitions as illustrated in FIG. 17, or the down-sampling order of sixteen 8×32 TB partitions as illustrated in FIG. 18. At step 2206, the control circuit 2104 checks if the number of retrieved TB partitions is equal to N. If the number of retrieved TB partitions is not equal to N yet, the flow proceeds with step 2204. If the number of retrieved TB partitions is equal to N, the flow proceeds with step 2208. At step 2208, the control circuit 2104 triggers the residual down-sampling circuit 2106 to perform a residual down-sampling operation upon the gathered TB partition(s).

In this embodiment, the residual down-sampling operation is triggered for processing received TB partition(s) when the number of retrieved TB partitions is equal to N, where N=1 or N=4. However, this is for illustrative purposes only, and is not meant to be a limitation of the present invention. Alternatively, the control circuit 2104 may trigger the residual down-sampling circuit 2106 when one residual column of the N transform block partitions is received and available for vertical down-sampling or one residual row of the N transform block partitions is received and available for horizontal down-sampling.

When the proposed residual down-sampling process of TB partitions is employed by a video encoder, the 64×64 intra/inter prediction order in scenario 1/2/3 can be the same as the 64×64 intra/inter prediction order in scenario 4, and is compatible with other typical videoing coding standards (e.g., VP9). In this way, the design complexity, cost and power consumption of the video encoder can be effectively reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A residual up-sampling apparatus comprising:
a residual up-sampling buffer, arranged to store an intermediate residual up-sampling result; and
a shared residual up-sampling circuit, arranged to employ a same processing kernel to perform each of a first-direction residual up-sampling operation and a second-direction residual up-sampling operation, wherein one of the first-direction residual up-sampling operation and the second-direction residual up-sampling operation is vertical up-sampling, another of the first-direction residual up-sampling operation and the second-direction residual up-sampling operation is horizontal up-sampling, the first-direction residual up-sampling operation processes an inverse transform output of an inverse transform circuit to generate the intermediate residual up-sampling result to the residual up-sampling buffer, and the second-direction residual up-sampling operation performs transpose access upon the residual up-sampling buffer to retrieve the intermediate residual up-sampling result, and processes the intermediate residual up-sampling result to generate a final residual up-sampling result.

2. The residual up-sampling apparatus of claim 1, wherein the shared residual up-sampling circuit is further arranged to store the final residual up-sampling result in the residual up-sampling buffer, such that the final residual up-sampling result is retrieved by a reconstruction circuit from the residual up-sampling buffer.

3. The residual up-sampling apparatus of claim 1, wherein the shared residual up-sampling circuit is further arranged to output the final residual up-sampling result to a reconstruction circuit without storing the final residual up-sampling result into the residual up-sampling buffer.

4. The residual up-sampling apparatus of claim 1, wherein the residual up-sampling buffer is allocated in a memory device in which the inverse transform output of the inverse transform circuit is stored.

5. A residual down-sampling apparatus comprising:
a residual down-sampling buffer, arranged to store an intermediate residual down-sampling result; and
a shared residual down-sampling circuit, arranged to employ a same processing kernel to perform each of a first-direction residual down-sampling operation and a second-direction residual down-sampling operation, wherein one of the first-direction residual down-sampling operation and the second-direction residual down-sampling operation is vertical down-sampling, another of the first-direction residual down-sampling operation and the second-direction residual down-sampling operation is horizontal down-sampling, the first-direction residual down-sampling operation processes a residual generation output of a residual generation circuit to generate the intermediate residual down-sampling result to the residual down-sampling buffer, and the second-direction residual down-sampling operation performs transpose access upon the residual down-sampling buffer to retrieve the intermediate residual down-sampling result, and processes the intermediate residual down-sampling result to generate a final residual down-sampling result.

6. The residual down-sampling apparatus of claim 5, wherein the shared residual down-sampling circuit is further arranged to store the final residual down-sampling result in the residual down-sampling buffer, such that the final residual down-sampling result is retrieved by a transform circuit from the residual down-sampling buffer.

7. The residual down-sampling apparatus of claim 5, wherein the shared residual down-sampling circuit is further arranged to output the final residual down-sampling result to a transform circuit without storing the final residual down-sampling result into the residual down-sampling buffer.

8. The residual down-sampling apparatus of claim 5, wherein the residual down-sampling buffer is allocated in a memory device in which the residual generation output of the residual generation circuit is stored.

9. A residual up-sampling circuit comprising:
a residual up-sampling transpose buffer, arranged to store an intermediate residual up-sampling result;
a first-direction residual up-sampling circuit, arranged to preform one of vertical up-sampling and horizontal up-sampling, wherein said one of the vertical up-sampling and the horizontal up-sampling comprises processing an inverse transform output of an inverse transform circuit to generate the intermediate residual up-sampling result to the residual up-sampling transpose buffer; and
a second-direction residual up-sampling circuit, arranged to perform another of the vertical up-sampling and the horizontal up-sampling, wherein said another of the vertical up-sampling and the horizontal up-sampling comprises performing transpose access upon the residual up-sampling transpose buffer to retrieve the intermediate residual up-sampling result, and processing the intermediate residual up-sampling result to generate a final residual up-sampling result, wherein the first-direction residual up-sampling circuit and the second-direction residual up-sampling circuit are two separate circuits;
wherein one of the first-direction residual up-sampling circuit and the second-direction residual up-sampling circuit starts processing residuals of a transform block before another of the first-direction residual up-sampling circuit and the second-direction residual up-sampling circuit finishes processing residuals of the transform block; or wherein one of the first-direction residual up-sampling circuit and the second-direction residual up-sampling circuit starts processing residuals of one transform block before another of the first-direction residual up-sampling circuit and the second-direction residual up-sampling circuit finishes processing residuals of another transform block.

10. The residual up-sampling circuit of claim 9, wherein the second-direction residual up-sampling circuit is further arranged to store the final residual up-sampling result in an inverse transform output buffer in which the inverse transform output is stored, such that the final residual up-sampling result is retrieved by a reconstruction circuit from the inverse transform output buffer.

11. The residual up-sampling apparatus of claim 9, wherein the second-direction residual up-sampling circuit is further arranged to output the final residual up-sampling result to a reconstruction circuit without storing the final residual up-sampling result into an inverse transform output buffer in which the inverse transform output is stored.

12. A residual down-sampling circuit comprising:
a residual down-sampling transpose buffer, arranged to store an intermediate residual down-sampling result;
a first-direction residual down-sampling circuit, arranged to preform one of vertical down-sampling and horizontal down-sampling, wherein said one of the vertical down-sampling and the horizontal down-sampling comprises processing a residual generation output of a residual generation circuit to generate the intermediate residual down-sampling result to the residual down-sampling transpose buffer; and
a second-direction residual down-sampling circuit, arranged to perform another of the vertical down-sampling and the horizontal down-sampling, wherein said another of the vertical down-sampling and the horizontal down-sampling comprises performing transpose access upon the residual down-sampling transpose buffer to retrieve the intermediate residual down-sampling result, and process the intermediate residual down-sampling result to generate a final residual down-sampling result, wherein the first-direction residual down-sampling circuit and the second-direction residual down-sampling circuit are two separate circuits;
wherein one of the first-direction residual down-sampling circuit and the second-direction residual down-sampling circuit starts processing residuals of a transform block before another of the first-direction residual down-sampling circuit and the second-direction residual down-sampling circuit finishes processing residuals of the transform block; or
wherein one of the first-direction residual down-sampling circuit and the second-direction residual down-sampling circuit starts processing residuals of one transform block before another of the first-direction residual down-sampling circuit and the second-direction residual down-sampling circuit finishes processing residuals of another transform block.

13. The residual down-sampling circuit of claim 12, wherein the second-direction residual down-sampling circuit is further arranged to store the final residual down-sampling result in a residual generation output buffer in which the residual generation output is stored, such that the final residual down-sampling result is retrieved by a transform circuit from the residual generation output buffer.

14. The residual down-sampling apparatus of claim 12, wherein the second-direction residual down-sampling circuit is further arranged to output the final residual down-sampling result to a transform circuit without storing the final residual down-sampling result into a residual generation output buffer in which the residual generation output is stored.

15. A residual up-sampling apparatus comprising:
a one-pass up-sampling circuit, arranged to perform a one-pass two-dimensional (2D) up-sampling operation upon an inverse transform output of an inverse transform circuit to output a plurality of up-sampled residuals one by one;
wherein the one-pass 2D up-sampling operation has a first-direction residual up-sampling operation and a second-direction residual up-sampling operation merged without transpose access, one of the first-direction residual up-sampling operation and the second-direction residual up-sampling operation is vertical up-sampling, and another of the first-direction residual up-sampling operation and the second-direction residual up-sampling operation is horizontal up-sampling.

16. The residual up-sampling apparatus of claim 15, wherein the one-pass up-sampling circuit comprises:
an inverse transform output buffer address generator, arranged to generate an inverse transform output buffer address to an inverse transform output buffer;
a one-pass up-sampling processor, arranged to perform the one-pass 2D up-sampling operation upon residual data read from the inverse transform output buffer in response to the inverse transform output buffer address; and
a controller, arranged to control the inverse transform output buffer address generator and the one-pass up-sampling processor.

17. The residual up-sampling apparatus of claim 16, wherein the inverse transform output buffer address generator decides the inverse transform output buffer address according to decode information, and the one-pass up-sampling processor configures the one-pass 2D up-sampling operation according to the decode information.

18. A residual down-sampling apparatus comprising:
a one-pass down-sampling circuit, arranged to perform a one-pass two-dimensional (2D) down-sampling operation upon a residual generation output of a residual generation circuit to output a plurality of down-sampled residuals one by one;
wherein the one-pass 2D down-sampling operation has a first-direction residual down-sampling operation and a second-direction residual down-sampling operation merged without transpose access, one of the first-direction residual down-sampling operation and the second-direction residual down-sampling operation is vertical down-sampling, and another of the first-direction residual down-sampling operation and the second-direction residual down-sampling operation is horizontal down-sampling.

19. The residual down-sampling apparatus of claim 18, wherein the one-pass down-sampling circuit comprises:
a residual generation output buffer address generator, arranged to generate a residual generation output buffer address to a residual generation output buffer;
a one-pass down-sampling processor, arranged to perform the one-pass 2D down-sampling operation upon residual data read from the residual generation output buffer in response to the residual generation output buffer address; and a controller, arranged to control the inverse transform output buffer address generator and the one-pass down-sampling processor.

20. The residual down-sampling apparatus of claim 19, wherein the residual generation output buffer address generator decides the residual generation output buffer address according to encode information, and the one-pass down-sampling processor configures the one-pass 2D down-sampling operation according to the encode information.

* * * * *